(12) United States Patent
Liston et al.

(10) Patent No.: US 10,263,796 B2
(45) Date of Patent: Apr. 16, 2019

(54) SYSTEMS AND METHODS FOR MANAGING POWER BASED ON MEDIA ASSET CONSUMPTION

(71) Applicant: Rovi Guides, Inc., San Carlos, CA (US)

(72) Inventors: Alexander W. Liston, Menlo Park, CA (US); Jonathan A. Logan, Mountain View, CA (US); William L. Thomas, Evergreen, CO (US); Ajay Kumar Gupta, Andover, MA (US); Mathew C. Burns, Dublin, CA (US); Margret B. Schmidt, Redwood City, CA (US); Gabriel C. Dalbec, Morgan Hill, CA (US)

(73) Assignee: Rovi Guides, Inc., San Jose, CA (US)

( * ) Notice: Subject to any disclaimer, the term of this patent is extended or adjusted under 35 U.S.C. 154(b) by 226 days.

(21) Appl. No.: 15/473,886

(22) Filed: Mar. 30, 2017

(65) Prior Publication Data

US 2018/0287808 A1 Oct. 4, 2018

(51) Int. Cl.
| | | |
|---|---|---|
| *G06F 15/16* | (2006.01) | |
| *H04L 12/12* | (2006.01) | |
| *H04L 29/06* | (2006.01) | |
| *H04L 29/08* | (2006.01) | |
| *H04N 21/442* | (2011.01) | |
| *H04N 21/466* | (2011.01) | |
| *H04N 21/472* | (2011.01) | |
| *H04N 21/482* | (2011.01) | |

(Continued)

(52) U.S. Cl.
CPC .......... *H04L 12/12* (2013.01); *H04L 65/4076* (2013.01); *H04L 67/306* (2013.01); *H04N 21/44218* (2013.01); *H04N 21/4532* (2013.01); *H04N 21/466* (2013.01); *H04N 21/47217* (2013.01); *H04N 21/4821* (2013.01); *H04N 21/4882* (2013.01); *Y02D 50/20* (2018.01)

(58) Field of Classification Search
None
See application file for complete search history.

(56) References Cited

U.S. PATENT DOCUMENTS

| | | |
|---|---|---|
| 6,239,794 B1 | 5/2001 | Yuen et al. |
| 6,388,714 B1 | 5/2002 | Schein et al. |

(Continued)

*Primary Examiner* — Dhairya A Patel
(74) *Attorney, Agent, or Firm* — Haley Guiliano LLP

(57) ABSTRACT

Systems and methods are provided herein for managing, based on a portion of media asset consumed, power consumption of user equipment. A media guidance application may, upon determining that user inactivity time at a user equipment exceeds a threshold inactivity time, determine that a media asset currently being presented at the user equipment has not reached its end point. The media guidance application may then determine a playback duration for which the media asset has been presented. The media guidance application may, upon determining that the playback duration exceeds a threshold playback duration, continue monitoring user activity at the user equipment until the end point for the media asset is reached to determine an updated user inactivity time. The media guidance application may determine that the updated inactivity time exceeds the threshold inactivity time and in response, perform a power management process to reduce power consumption of the user equipment.

20 Claims, 8 Drawing Sheets

(51) Int. Cl.
    *H04N 21/45*           (2011.01)
    *H04N 21/488*         (2011.01)

(56) References Cited

U.S. PATENT DOCUMENTS

| | | |
|---|---|---|
| 6,564,378 B1 | 5/2003 | Satterfield et al. |
| 6,756,997 B1 | 6/2004 | Ward, III et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 9,106,780 B1 | 8/2015 | Newstadt et al. |
| 2002/0174430 A1 | 11/2002 | Ellis et al. |
| 2003/0110499 A1 | 6/2003 | Knudson et al. |
| 2005/0052446 A1* | 3/2005 | Plut ................... G06F 1/3218 345/211 |
| 2005/0251827 A1 | 11/2005 | Ellis et al. |
| 2010/0153885 A1 | 6/2010 | Yates |
| 2013/0278709 A1* | 10/2013 | Mock ................... H04N 7/15 348/14.03 |
| 2014/0157026 A1* | 6/2014 | So ..................... G06F 1/3206 713/323 |
| 2015/0128160 A1* | 5/2015 | Benea ............. H04N 21/4223 725/12 |
| 2015/0143225 A1* | 5/2015 | Pflueger ............ G06F 17/2247 715/234 |
| 2015/0253838 A1* | 9/2015 | Amsterdam ......... G06F 1/3228 713/323 |
| 2018/0367845 A1* | 12/2018 | Tran ............... H04N 21/44218 |

\* cited by examiner

SYSTEMS AND METHODS FOR MANAGING POWER BASED ON MEDIA ASSET CONSUMPTION

BACKGROUND

In currently available media systems, media devices may be switched to a power saving mode upon detecting that there has been no user activity at the media device for some pre-defined time period. However, current systems do not account for the fact that user inactivity at a media device is not necessarily indicative of the media device not currently being utilized. For example, user inactivity at a media device may be due to user being highly engaged in a media asset currently being consumed and thus, inactive. Therefore, in many cases, media device being switched to a low power mode following a period of inactivity may be disruptive to a user's media consumption experience. This problem is particularly acute when a media device is switched to a power saving mode while a user is still consuming a given media asset. Thus, current systems can be improved to minimize disruptions to a user's media consumption experience when optimizing power consumption of media devices.

SUMMARY

Therefore, systems and methods are disclosed herein for managing power consumption of user equipment devices based on a portion of a media asset being consumed. A media guidance application may, upon determining that user inactivity time at a user equipment device exceeds a threshold inactivity time, determine a media asset currently being presented at the user equipment device. The media guidance application may determine that an end point for the media asset currently being presented has not been reached and determine a playback duration for which the media asset has been presented. The media guidance application may, upon determining that the playback duration exceeds a threshold playback duration, continue monitoring user activity at the user equipment device until the end point for the media asset currently being presented is reached to determine an updated user inactivity time. The media guidance application may determine that the updated inactivity time exceeds the threshold inactivity time and in response, perform a power management process to reduce power consumption of the user equipment device.

As an illustrative example, the media guidance application may detect that there has been no activity at a user device (e.g., a set-top box) for a pre-defined period of time (e.g., ninety minutes). The media guidance application may refrain from performing power management activity that may be disruptive to a user's media consumption experience (e.g., displaying a notification, stopping streaming of content to the set-top box) upon determining that there has been no activity at the user device for the pre-defined period of time. Instead, the media guidance application may determine a media asset currently presented via the device and an end time for the media asset. For example, the set-top box may be presenting a live broadcast media asset that has a scheduled end time twenty-two minutes after the current time. In this case, if no user activity is detected in the meantime, the media guidance application may wait until the media asset ends (i.e., for twenty-two minutes) before performing a power management activity.

In some embodiments, the media guidance application may monitor for indicators of user activity at a user equipment device. Indicators of user activity may be any activity that indicates that a user is currently using the user equipment device. Indicators of user activity can be, but are not limited to, actions performed at the user equipment device or at another device associated with the user equipment device (e.g., volume changes, playback speed changes, channel surfing, scheduling recordings and other suitable actions), user's activity during presentation of a media asset at the user equipment device (e.g., user's social media activity, user's movements and gestures and other suitable activity) and user's physiological and emotional response while a media asset is being presented at the user equipment device (e.g., user's heart rate, facial expressions and other responses). The media guidance application may access a variety of monitoring devices (e.g., image and video capture devices, motion, physiological, and neurological sensors and other suitable monitoring devices) to monitor for the indicators of user activity.

In some embodiments, the media guidance application may determine that an indicator of user activity has been detected upon determining that a user of the user equipment device has updated, while a given media asset is being presented at the user equipment device, a social media platform with information about the given media asset. Specifically, the media guidance application may determine, based on accessing a data structure associated with the user equipment device, a user identifier for a user associated with the user equipment device. A user identifier for a given user is a unique identifier associated with the given user such as a string of characters or bio-metric data (e.g., finger print, retina scan, voice recognition or another suitable bio-metric data). For example, the media guidance application may access a current user data structure associated with the user equipment device and retrieve the user name "John Smith." The media guidance application may determine, based on the user identifier, a user profile associated with the user associated with the user equipment device. For example, the media guidance application may query, using database management languages (e.g., SQL, JAPQL, CODASYL or another suitable language, a user profile database for a user profile associated with "John Smith." The query result may include a unique or specific identifier associated with the user profile for "John Smith" or a pointer or link to the user profile for "John Smith," which the media guidance application may use to retrieve the user profile for "John Smith". In some embodiments, the media guidance application may receive the user profile for "John Smith" itself in response to the query.

The media guidance application may determine, based on accessing the user profile associated with the user, a social media account associated with the user. For example, the media guidance application may access the user profile for "John Smith" and determine a Facebook account associated with "John Smith." The media guidance application may determine, based on accessing the social media account associated with the user, whether the user updated the social media account with information about the media asset currently being presented while the media asset was being presented. For example, the media guidance application may access a data structure associated with the user equipment device to retrieve a time stamp corresponding to a start time of the presentation of the media asset. The media guidance application may also retrieve a time stamp corresponding to a current time. Time stamp may be in the format "Month, Day, Year, Hour: Minute: Second." For example, the media guidance application may retrieve time stamp of "Mar. 3, 2017, 09:00:00" corresponding to the start time of the presentation of the media asset and time stamp of "Mar. 3, 2017, 09:45:00" corresponding the current time. The media guidance application may query the social media account for updates made in between "Mar. 3, 2017, 09:00:00" and "Mar. 3, 2017, 09:45:00" that relate to the media asset currently being presented at the user equipment device (e.g., "Star Wars: Episode V").

The media guidance application may, in response to determining that the user updated the social media account with information about the media asset currently being presented while the media asset was being presented, determine that an indicator of user activity is detected. For example, the media guidance application may determine, based on a positive query result, that John Smith updated his Facebook account with the update "Watching Star Wars: Episode V. So good!" on Mar. 3, 2017, 09:25:00. The media guidance application may accordingly determine that activity by John Smith at the user equipment device has been detected.

The media guidance application may determine, based on data from the monitoring for indicators of user activity, that user inactivity time is greater than a threshold inactivity time, where the user inactivity time corresponds to a duration of time from a time corresponding to a last detected indicator of user activity at the user equipment device to a current time. For example, the media guidance application may maintain a user inactivity time counter in the format "hour:minutes:second." The media guidance application may reset user inactivity time counter to zero (i.e., 00:00:00) every time a user activity is detected. The media guidance application may increment the user inactivity time counter based on a clock signal associated with the user equipment device or some other reference clock. For example, the media guidance application may determine that the current value of the user inactivity time counter is (1:01:00). The media guidance application may access a data structure associated with the user equipment device (e.g., default parameters data structure) to retrieve the threshold inactivity time. For example, the threshold inactivity time may be (01:00:00). The media guidance application may determine, based on comparing the threshold inactivity time with the current value of the user inactivity time counter, that the user inactivity time is greater than a threshold inactivity time.

The media guidance application may determine a media asset currently being presented at the user equipment device. For example, the media guidance application may access a data structure associated with a playback application currently being executed at the user equipment device to retrieve an identifier corresponding to media asset that the playback application is presenting. The media asset identifier can be, but is not limited to media asset title, media asset program ID or any other suitable identifier. For example, the media guidance application may determine that the media asset currently being presented at the user equipment device is "Star Wars: Episode V." The media guidance application may determine, based on accessing a data structure associated with the media asset, a start time corresponding to a start point of the media asset and an end time corresponding to the end point of the media asset. For example, the media guidance application may access a data structure associated with "Star Wars: Episode V" to retrieve a time stamp corresponding to a time when playback of "Star Wars: Episode V" was started at the user equipment device (e.g., "Mar. 3, 2017, 09:00:00") and a time stamp corresponding to a time when playback of "Star Wars: Episode V" will end at the user equipment device (e.g., "Mar. 3, 2017, 11:00:00"). In some embodiments, the media guidance application may retrieve a length of the "Star Wars: Episode V" from the data structure associated with "Star Wars: Episode V." In some embodiments, the media guidance application may access metadata associated "Star Wars: Episode V" to determine (e.g., using suitable metadata extraction techniques) the length of "Star Wars: Episode V." In some embodiments, the media guidance application may compute the end time for "Star Wars: Episode V" based on the start time for "Star Wars: Episode V" and the length of "Star Wars: Episode V."

The media guidance application may determine, based on comparing the current time with the end time for the media asset, that the end point for the media asset currently being presented has not been reached. For example, the media guidance application may determine based on comparing time stamp corresponding to current time (e.g., "Mar. 3, 2017, 09:45:00") and time stamp corresponding to end time for "Star Wars: Episode V" (e.g., "Mar. 3, 2017, 11:00:00"), that the end point of "Star Wars: Episode V" has not been reached. The media guidance application may, in response to determining that the end point for the media asset currently being presented has not been reached, determine, based on the current time and the start time, a playback duration for which the media asset has been presented. For example, the media guidance application may compute, based on the time stamp corresponding to current time (e.g., "Mar. 3, 2017, 09:45:00") and time stamp corresponding to when playback of "Star Wars: Episode V" was started at the user equipment device (e.g., "Mar. 3, 2017, 09:00:00"), "Star Wars: Episode V" has been played back for forty-five minutes.

The media guidance application may determine, based on comparing the playback duration with a threshold playback duration, whether the playback duration exceeds the threshold playback duration. For example, the media guidance application may access a data structure (e.g., default parameters data structure) to retrieve the threshold playback duration. For example, the threshold playback duration may be thirty minutes. Following from the previous example, where "Star Wars: Episode V" was played back for forty-five minutes, the media guidance application may determine that the playback duration of "Star Wars: Episode V" exceeds the threshold playback duration. The media guidance application may, in response to determining that the playback duration exceeds the threshold playback duration, continue monitoring for indicators of user activity at the user equipment device until the end time is reached. For example, the media guidance application may continue monitoring for indicators of user activity at the user equipment device until time stamp corresponding to current time matches a time stamp corresponding to end point of playback of "Star Wars: Episode V" at the user equipment device (e.g., "Mar. 3, 2017, 11:00:00"). In some embodiments, the media guidance application may continue monitoring for indicators of user activity at the user equipment device until the media guidance application detects that a current progress point in the media asset currently being presented coincides with the end point of the media asset.

The media guidance application may determine whether playback duration of a given media asset exceeds a threshold playback duration to determine whether the playback duration of the given media asset is a significant contributor to the user inactivity time. For example, if a given media asset has been presented for only five minutes, the given media asset is not a significant contributor to total the user inactivity time and the user inactivity cannot reliably be attributed to engagement in the given media asset. On the other hand, if a given media asset has been presented for fifty minutes, playback duration of the given media asset is a significant contributor to the user inactivity time and user inactivity may plausibly be due to engagement in the given media asset. In cases where playback duration of the given media asset is a significant contributor to the user inactivity time, the media guidance application may wait until the end point of the given media asset is reached to perform a power management process to avoid disrupting the user's consumption of the given media asset.

In some embodiments, the media guidance application may determine whether a media asset currently being presented at the user equipment device is a significant contributor to the user inactivity time based in part on an attribute associated with the media asset. For example, the threshold playback duration may vary based on the media asset currently being presented. As an illustrative example, a media asset that typically engages a user rapidly (e.g., a fast-paced sci-fi movie) may need to be consumed for a shorter period of time than a media asset that requires longer time to engage a user (e.g., a serious documentary) to be considered a significant contributor to the user inactivity time. Specifically, the threshold playback duration may be based in part on an attribute associated with the media asset currently being presented. For example, the threshold playback duration for "Star Wars: Episode V" may be thirty minutes but the threshold playback duration for documentary about polar bears may be fifty minutes. An attribute associated with the media asset can be, but in not limited to, genre of media asset, length of media asset, content rating, actor, director, plotline, and setting.

In some embodiments, the threshold inactivity time may vary based on a user associated with the user equipment device. For example, different users may have different media consumption habits. A first user may typically be inactive while consuming media assets. As a result, for the first user, long periods of inactivity at the user equipment device may not necessarily indicate that the first user is not using the user equipment device. A second user may typically be active (e.g., frequent channel changes, moving around and other suitable actions) while consuming media assets. As a result, for the second user, long periods of inactivity at the user equipment device may indicate that the second user is not using the user equipment device. Specifically, the threshold inactivity time may be based in part on a user profile data structure corresponding to a user associated with the user equipment device. As an illustrative example, at a given point in time, the media guidance application may determine, based on accessing a current user data structure associated with the user equipment device, that the current user of the user equipment device is "John Smith." The media guidance application may access John Smith's user profile to determine the threshold inactivity time for John Smith. For example, John Smith may typically be inactive while consuming media assets and the media guidance application may retrieve a threshold inactivity time of sixty minutes for John Smith. For example, at another point in time, the media guidance application may determine, based on accessing a current user data structure associated with the user equipment device, that the current user of the user equipment device is "Mary Smith." The media guidance application may access Mary Smith's user profile to determine the threshold inactivity time for Mary Smith. For example, Mary Smith may typically be active while consuming media assets and the media guidance application may retrieve a threshold inactivity time of thirty minutes for Mary Smith.

The media guidance application may determine, based on data from the monitoring for indicators of user activity at the user equipment device until the end time is reached, an updated user inactivity time. For example, the media guidance application may update the user inactivity time counter, in manners discussed previously in relation to determining user inactivity time, based on data from the monitoring for indicators of user activity until time stamp corresponding to current time matches a time stamp corresponding to end point of "Star Wars: Episode V" at the user equipment device (e.g., "Mar. 3, 2017, 11:00:00"). For example, no indicators of user activity may be detected while monitoring until the end point of "Star Wars: Episode V." Following from the previous example, where user inactivity time counter was (1:01:00) when current time stamp was "Mar. 3, 2017, 09:45:00," the media guidance application may determine that the user inactivity time counter is (2:16:00) at current time stamp "Mar. 3, 2017, 11:00:00." The media guidance application may determine, based on comparing the updated user inactivity time with the threshold inactivity time, that the updated inactivity time exceeds the threshold inactivity time. The media guidance application may, in response to determining that the user inactivity exceeds the threshold inactivity time, perform a power management process to reduce power consumption of the user equipment device. For example, the media guidance application may retrieve, from a default parameters data structure associated with the user equipment device or a user profile data structure corresponding to a user associated with the user equipment device, the threshold inactivity time (e.g., (01:00:00)). For example, the media guidance application may determine, based on executing an appropriate Boolean comparison function, that the user inactivity time counter of (2:16:00) exceeds the threshold inactivity time of (01:00:00) and accordingly, the media guidance application may perform a power management process.

In some embodiments, the media guidance application may, when performing a power management process, stop execution of a particular application, power-off devices or switch devices to low power modes. Specifically, in some embodiments, the media guidance application may, when performing a power management process, terminate a content streaming application at the user equipment device. For example, the media guidance application may determine that "Star Wars: Episode V" is being presented through a video-on-demand streaming application (e.g., Amazon Prime Instant Video) and the media guidance application may terminate the video-on-demand streaming application. In some embodiments, the media guidance application may, when performing a power management process, power-off the user equipment device. For example, the user equipment device may be a set-top box and the media guidance application may turn off the set-top box. In some embodiments, the media guidance application may, when performing a power management process, switch the user equipment device to a low power mode. For example, the media guidance application may turn the set-top box to a power-saving or sleep mode instead of completely powering the set-top box down. In some embodiments, the media guidance application may, when performing a power management process, power-off another user equipment device that is associated with the user equipment device. In some embodiments, the media guidance application may, when performing a power management process, switch the another user equipment to a low power mode. For example, the media guidance application may either turn a television associated with a set-top box off or the media guidance application may set the television to power-saving or sleep mode.

In some embodiments, the media guidance application may, when performing the power management process, display a notification that requests a user input. The media guidance application may detect that no user input is received within a pre-defined interval after the notification is displayed and accordingly, the media guidance application may power off the user equipment device. Specifically, the media guidance application may generate for display, on a display device associated with the user equipment device, a notification, where the notification requests a user input. For example, the media guidance application may display, on a television associated with a set-top box, a notification "Are you still here?" along with a user selectable option "Yes."

The media guidance application may determine whether the user input is received within a pre-defined user response time interval from a time when the notification is displayed. For example, the media guidance application may start incrementing, based on a reference clock, a response time counter, initialized at zero, from the time the notification is displayed. The media guidance application may set the response time counter to zero upon receiving the user input. As an illustrative example, the response time counter may be in the format (hour: minute: second). The media guidance application may access a data structure associated with the user equipment device (e.g., default parameters data structure) to retrieve the pre-defined user response time interval (e.g., one minute). For example, the media guidance application may detect that the selectable option "yes" has not been selected within one minute and one second after the display of the notification. The media guidance application may accordingly increment the value of the response time counter to (00:01:01). The media guidance application may determine, based on executing an appropriate Boolean comparison function, that the response time counter (e.g., (00:01:01)) exceeds the pre-defined user response time interval (e.g., (00:01:00) or one minute). Accordingly, the media guidance application may determine the user input is not received within the pre-defined user response time interval. The media guidance application may, in response to determining that the user input is not received within the pre-defined user response time interval, power off the user equipment device.

In some embodiments, the media guidance application may, prior to displaying a notification, determine the next unimportant segment in a media asset currently being displayed and display the notification during the next unimportant segment. In some embodiments, the media guidance application may determine whether a segment is unimportant based on the current user of the user equipment device and an attribute of the media asset. Specifically, the media guidance application may, when generating for display a notification, determine, based accessing a data structure associated with a different media asset currently being presented, a next segment in the different media asset that is associated with an importance score below a threshold importance score. The media guidance application may generate for display the notification during the next segment in the different media asset.

A media asset may include multiple segments. Each segment of the media asset may further include multiple frames. A segment in the media asset may be defined by time codes corresponding to the start frame and the end frame of the segment. For example, a time code associated with a frame of the media asset may be in the format (hour: minute: second: frame) where (hour: minute: second) portion indicates an amount of time elapsed from start point of the media asset and (frame) identifies a frame associated with point in time indicated by the (hour: minute: second) portion. For example, the media asset "Big Bang Theory" may be presented after the end of media asset "Star Wars: Episode V." "Big Bang Theory" may include a re-cap segment with start and end frames (00:00:00:00) and (00:00:01:00) respectively. The re-cap segment in "Big Bang Theory" may be followed by an opening credits segment with start and end frames (00:00:01:01) and (00:00:02:00) respectively. A data structure or metadata associated with a media asset may include information about start frame and end frame for a given segment of a media asset and importance score for the given segment of the media asset.

Importance score for a given segment in a media asset is an indication of how crucial the given segment is to the media consumption experience of the media asset. In some embodiments, importance score may be fuzzy logic variables such as "very important," "moderately important" and "not important." In some embodiments, the importance score may be a numerical value (e.g., five) on a pre-defined scale (e.g., scale ranging from zero to ten where zero corresponds to lowest possible importance and ten corresponds to highest possible importance). As an illustrative example, the re-cap segment in "Big Bang Theory" may have an importance score of six whereas the opening credits segment may have an importance score of two. The media guidance application may access a default parameters data structure to retrieve the threshold importance score. For example, the threshold importance score may be five. The media guidance application may compare, in sequential order of segments in a given media asset, importance score of the segments in the given media asset with the threshold importance score to determine the next segment that has a importance score less than the threshold importance score. For example, the media guidance application may determine the next segment in "Big Bang Theory" with importance score (e.g., two) less than the threshold importance score (e.g., five) is the opening credits segment. Accordingly, the media guidance application may generate for display a notification requiring user input (e.g., "Are you here?" with the selectable option "yes") during the opening credits segment of "Big Bang Theory."

In some embodiments, the threshold importance score may be a variable so that the media guidance application can use a more stringent criteria when determining the next unimportant segment of a media asset that a user cares about. Specifically, the threshold importance score may be based in part on a user profile data structure corresponding to a user associated with the user equipment device and an attribute associated with the different media asset currently being presented. For example, the media guidance application may determine, based on accessing current user data structure associated with the user equipment device, that the user associated with the user equipment device is "John Smith." The media guidance application may access John Smith's user profile data structure, in manners described previously, to determine John Smith's media consumption preferences. Media consumption preferences can be, but is not limited to, genre, actors, content rating, directors, plotline, and setting. The media guidance application may determine, based on accessing a data structure or metadata associated with a given media asset, attributes associated with the given media asset. The media guidance application may then compare the attributes associated with the given media asset with a user's media consumptions preferences to determine a level of similarity of the given media asset is to the user's preferred media assets. The media guidance application may then compute the threshold importance score as a function of the level of similarity of the given media asset to the user's preferred media assets.

As an illustrative example, the media guidance application may use a formula such as [(default threshold importance score+constant A*(constant B−level of similarity of a given media asset to the user's preferred media assets)] to compute the threshold importance score for a given media asset. As an illustrative example, the values for default threshold importance score, constant A and constant B may be five, five and one-half respectively (i.e., the formula may be [(5+5*(½−level of similarity of a given media asset to the user's preferred media assets)]. The level of similarity of a given media asset to the user's preferred media assets may be defined as a percentage.

As an illustrative example, the different media asset may be "Big Bang Theory" which is a comedy sitcom. The media guidance application may determine that user John Smith's media consumption preferences includes comedy sitcoms and accordingly, the media guidance application may compute a eighty percent level of similarity between "Big Bang Theory" and John Smith's preferred media assets. The media guidance application may then compute the threshold importance score to be 3.8. As another illustrative example, when the user associated with the user equipment device is Mary Smith, the media guidance application may determine that the user Mary Smith's media consumption preferences includes documentary films but no comedy sitcoms. In this case, the media guidance application may may compute a ten percent level of similarity between "Big Bang Theory" and Mary Smith's preferred media assets. The media guidance application may then compute the threshold importance score to be seven. Following from the previous example, where re-cap segment of "Big Bang Theory" has an importance score of six and the opening credits segment has an importance score of two, the media guidance application may generate for display the notification during the opening credits segment when the user is John Smith and during the re-cap segment when the user is Mary Smith.

In some embodiments, the media guidance application may, when performing the power management process, transmit a video signal to a display device and determine whether a display on the display device, after the video signal transmission, matches an expected display. The media guidance application may, upon determining that the display on the display device does not match the expected display, automatically power off the user equipment device. Specifically, the media guidance application may transmit a video signal from the user equipment device to a display device associated with the user equipment device. For example, the media guidance application may transmit a video signal for an overlay "This is a test." to a television associated with a set-top box. The media guidance application may monitor, using a first sensor device, display at the display device following the transmission of the video signal. For example, the media guidance application may use an image capture device (e.g., a camera) to capture a series of images that are displayed on the television after the video signal is transmitted to the television.

The media guidance application may determine, based on comparing data received from the first sensor device with the transmitted video signal, whether an image displayed at the display device matches an image included in the transmitted video signal. As an illustrative example, the media guidance application may access a data structure associated with the video signal to retrieve a video frame (i.e., the expected image) of the video signal. The media guidance application may fingerprint the retrieved video frame to create a fingerprint for the video frame. As a non-limiting example, the media guidance application may, when fingerprinting the retrieved video frame, use a hashing algorithm (e.g., a-hash, p-hash, d-hash, w-hash and other suitable hashing algorithm) to compute a "video frame hash." Similarly, the media guidance application may retrieve an image of the display on the television that was captured by the image capture device following the transmission of the video signal. The media guidance application may fingerprint, in manners described previously, the retrieved captured image. For example, the media guidance application may compute a "captured image hash." The media guidance application may determine, by executing an appropriate program script, whether the "captured image hash" matches the "video frame hash." Following from the previous example, the video frame may be for an overlay "This is a test." As a matter of example, the television may be turned off when the video signal is transmitted. Consequently, the captured image of the television display may be that of a blank television screen. As a result, "video frame hash" and "captured image hash" may be very different and the media guidance application may determine that "video frame hash" and "captured image hash" are not a match.

The media guidance application may, in response to determining that the image displayed at the display device does not match the image included in the transmitted video signal, automatically, without any user input, power off the user equipment device. For example, the media guidance application may, after determining that "video frame hash" and "captured image hash" are not a match, automatically turn off the set-top box without requesting any further user input. In some embodiments, the media guidance application may automatically switch the set-top box to a low-power operation mode instead of powering it off completely.

In some embodiments, the media guidance application may, when performing the power management process, transmit an audio signal to an audio device associated with the user equipment device and determine whether a sound emitted by the audio device, following the transmission of the audio signal, matches an expected sound. The media guidance application may, upon determining that the sound emitted by the audio device does not match an expected sound, automatically power off the user equipment device. In some embodiments, the media guidance application may transmit an audio signal to an audio device associated with the user equipment device upon determining that a display on a display device associated with the user equipment device did not match an expected display.

Specifically, the media guidance application may, in response to determining that the image displayed at the display device does not match the image included in the transmitted video signal, transmit an audio signal from the user equipment device to an audio device associated with the user equipment device. For example, the media guidance application may transmit a audio signal for "Hello!" to a speaker associated with a set-top box. The media guidance application may monitor, using a second sensor device, audio at the audio device following the transmission of the audio signal. For example, the media guidance application may use a sound detector to capture the sound that is emitted by the speaker after the audio signal is transmitted to the speaker.

The media guidance application may determine, based on comparing data received from the second sensor device with the transmitted audio signal, whether a sound pattern received from the audio device matches a sound pattern included in the transmitted audio signal. As an illustrative example, the media guidance application may access a data structure associated with the audio signal to retrieve a sound signature (i.e., the expected sound) for the audio signal. As an illustrative example, the sound signature for the audio signal may be the frequency makeup of the audio signal. The media guidance application may retrieve, from the data received from the sound detector, the sound emitted by the speaker following transmission of the audio signal to the speaker (i.e., sound pattern received from the audio device). The media guidance application may determine a sound signature of the sound emitted by the speaker following transmission of the audio signal to the speaker. As an illustrative example, the media guidance application may execute a program script that receives a sound signal as an input and returns Fast Fourier transform (FFT) of the sound signal to determine the sound signature of the sound emitted by the speaker.

The media guidance application may determine, by executing an appropriate program script, whether the sound signature of the audio signal matches the sound signature of the sound emitted by the speaker. Following from the previous example, the audio signal may be the sound "Hello." As a matter of example, the speaker may be turned off when the audio signal is transmitted. Consequently, there may be no sound emitted by the speaker. As a result, sound signature of the audio signal and the sound signature of the sound emitted by the speaker may be very different and the media guidance application may determine that the audio signal and the sound emitted by the speaker are not a match. The media guidance application may, in response to determining that the sound pattern received from the audio device does not match the sound pattern included in the transmitted audio signal, automatically, without any user input, power off the user equipment device. Upon determining that the audio signal and the sound emitted by the speaker are not a match, the media guidance application may automatically turn off the set-top box without requesting any further user input. In some embodiments, the media guidance application may automatically switch the set-top box to a low-power operation mode instead of powering it off completely.

In some embodiments, the media guidance application may, when performing the power management process for a given user equipment device, determine another user equipment device that is associated with the user of the given user equipment device. Upon detecting no activity at the given user equipment device for a threshold time, the media guidance application may send, to the other user equipment device, a notification that requests a user input. The media guidance application may detect that no user input is received at the other user equipment device within a pre-defined interval after the notification is sent and accordingly, the media guidance application may power off the given user equipment device. In some embodiments, the media guidance application may send the notification for requesting user input to the another user equipment device upon determining that a sound emitted by an audio device associated with the given user equipment device did not match the expected sound.

Specifically, the user equipment device may be a first user equipment device and the media guidance application may, in response to determining that the sound pattern received from the audio device does not match the sound pattern included in the transmitted audio signal, determine, based on accessing a data structure associated with the first user equipment device, a user identifier for a user associated with the first user equipment device. For example, the media guidance application may access a current user data structure associated with the user equipment device (e.g., a set-top box) to retrieve the user name "John Smith." The media guidance application may determine, based on accessing a data structure associated with the user identifier, a second user equipment device associated with the user associated with the first user equipment device. For example, the media guidance application may access the user profile for "John Smith" and retrieve an identifier (e.g., mobile phone number) for a mobile device associated with "John Smith."

The media guidance application may transmit a notification to the second user equipment device, where the notification requests a user input. For example, the media guidance application may transmit a notification "Are you still using the set-top box?" along with a user selectable option "Yes" to John Smith's mobile device. The media guidance application may determine whether the user input is received from the second user equipment device within a pre-defined user response time interval from a time when the notification is transmitted. The media guidance application may determine, in manners described previously in relation to determining whether a response is received within a pre-defined time interval after displaying a notification on a display device associated with the user equipment device, whether user selection of the selectable option "yes" is received at the mobile device within pre-defined time interval (e.g., one minute after transmission of the notification to the mobile device). The media guidance application may, in response to determining that the user input is not received within the pre-defined user response time interval, power off the first user equipment device. For example, the media guidance application may determine the selectable option "yes" has not been selected at the mobile device within one minute after the transmission of the notification to the mobile device. Responsively, the media guidance application may turn off the set-top box. In some embodiments, the media guidance application may switch the set-top box to a low-power operation mode instead of powering it off completely.

Conventional systems are limited to switching a media device to a power saving mode upon detecting that there has been no user activity at the media device for some pre-defined time period. Conventional systems do not take into account the fact that user inactivity at a media device may be due to user being highly engaged in a media asset currently being consumed and thus, inactive. As a result, conventional systems may turn off a media device while a user is consuming a given media asset, resulting in an unsatisfactory user experience. Systems and methods provided herein address this issue by managing power consumption of user equipment devices based on a portion of media asset consumed. These systems and methods, upon determining that portion of the media asset currently being consumed exceeds a threshold portion, waits until the end point of the media asset before performing a power management process. Thus, these systems and methods improve upon conventional systems by minimizing disruptions to a user's media consumption experience when optimizing power consumption of media devices.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The described systems and methods manage power consumption of user equipment devices based on a portion of media asset consumed. A media guidance application may, upon determining that user inactivity time at a user equipment device exceeds a threshold inactivity time, determine a media asset currently being presented at the user equipment device. The media guidance application may determine that an end point for the media asset currently being presented has not been reached and determine a playback duration for which the media asset has been presented. The media guidance application may, upon determining that the playback duration exceeds a threshold playback duration, continue monitoring user activity at the user equipment device until the end point for the media asset currently being presented is reached to determine an updated user inactivity time. The media guidance application may determine that the updated inactivity time exceeds the threshold inactivity time and in response, perform a power management process to reduce power consumption of the user equipment device.

Figure 5:
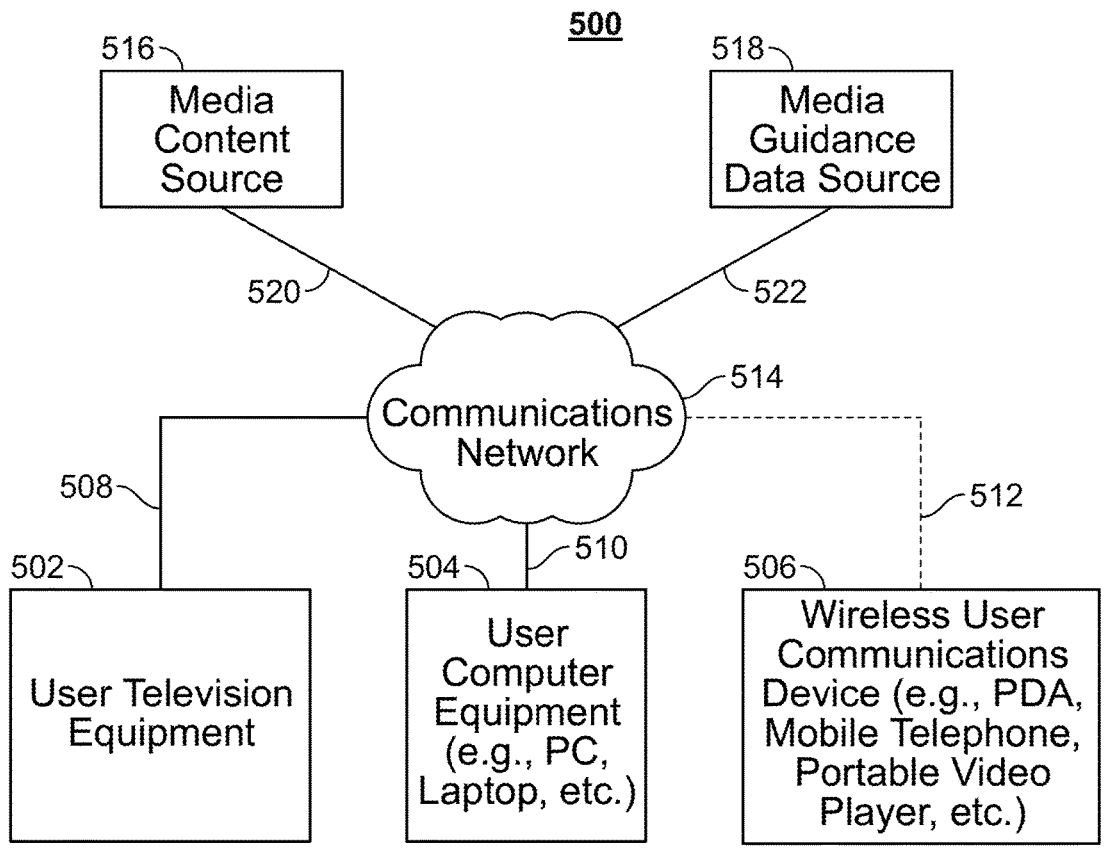
FIG. 5 is a block diagram of an illustrative media system in accordance with some embodiments of the disclosure.

The media guidance application may reside on user television equipment 502 (FIG. 5), user computer equipment 504 (FIG. 5), and/or wireless user communications device 506 (FIG. 5). In some embodiments, some or all portions of the media guidance application may be located at media content source 516 (FIG. 5) and/or media guidance data source 518 (FIG. 5). In some embodiments, portions of the media guidance application may be located on each of user television equipment 502 (FIG. 5), user computer equipment 504 (FIG. 5), wireless user communications device 506 (FIG. 5), media content source 516 (FIG. 5) and media guidance data source 518 (FIG. 5).

Figure 1:
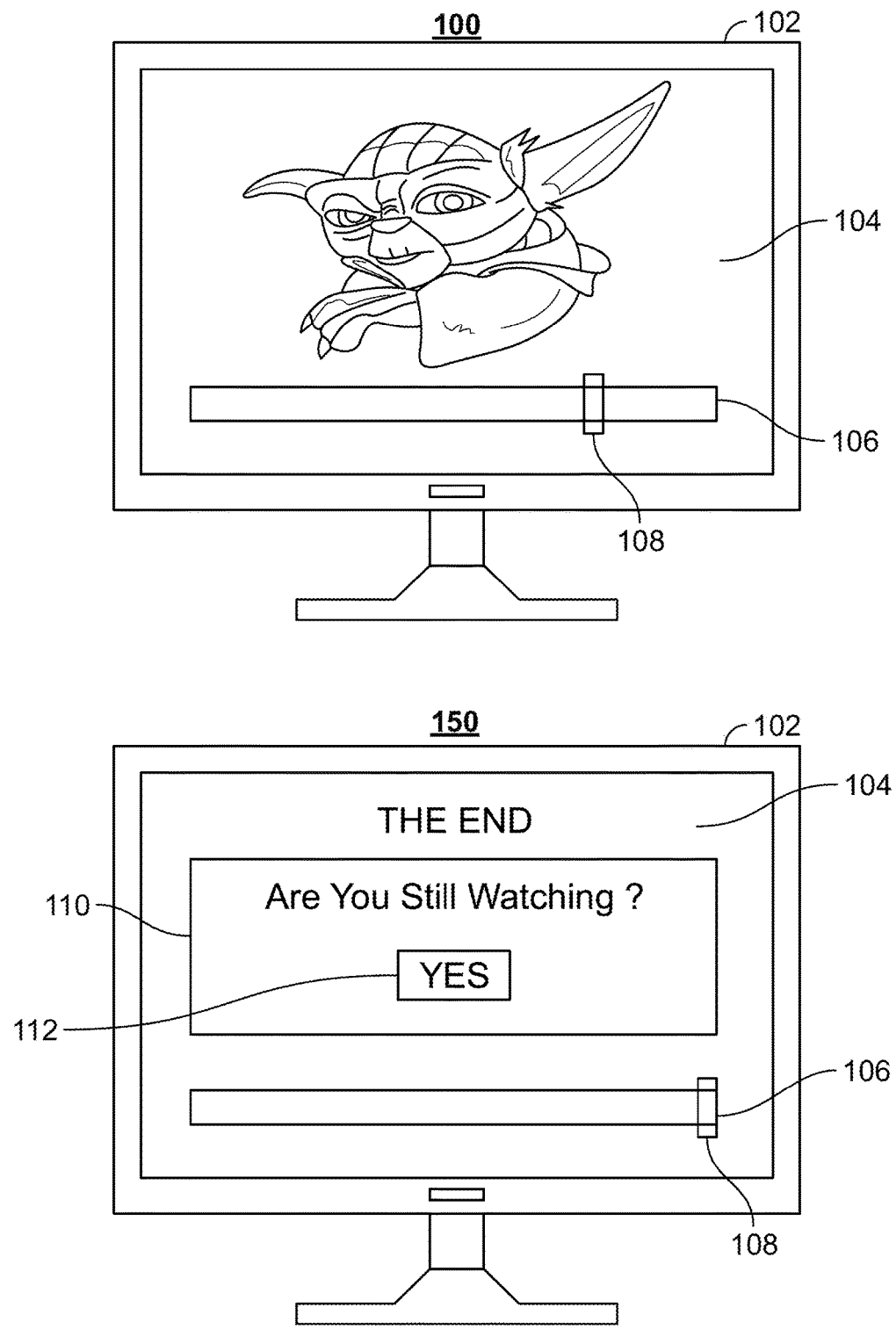
FIG. 1 shows user equipment devices where power management process based on media asset consumption may occur, in accordance with some embodiments of the disclosure.

FIG. 1 shows user equipment devices where power management process based on media asset consumption may occur, in accordance with some embodiments of the disclosure. FIG. 1 depicts media asset 104 that the media guidance application may generate for display at user equipment device 102 at a time 100. At time 100, a current progress point indicator 108, that corresponds to a current progress point in playback of media asset 104, may be prior to an end point 106 for media asset 104. In some embodiments, the media guidance application may monitor for indicators of user activity at a user equipment device (e.g., user equipment device 102). Indicators of user activity may be any activity that indicates that a user is currently using the user equipment device. Indicators of user activity can be, but are not limited to, actions performed at the user equipment device or at another device associated with the user equipment device (e.g., volume changes, playback speed changes, channel surfing, scheduling recordings and other suitable actions), user's activity during presentation of a media asset at the user equipment device (e.g., user's social media activity, user's movements and gestures and other suitable activity) and user's physiological and emotional response while a media asset is being presented at the user equipment device (e.g., user's heart rate, facial expressions and other responses). The media guidance application may access a variety of monitoring devices (e.g., image and video capture devices, motion, physiological, and neurological sensors and other suitable monitoring devices) to monitor for the indicators of user activity. In some embodiments, the media guidance application may, when monitoring for user activity at a user equipment, monitor for ambient sound at the user equipment, where ambient sound is sound that is not audio associated with media asset currently being presented at the user device. The media guidance application may use signal processing techniques on the ambient sound to determine whether a user is currently located in the vicinity of the user equipment and thus consuming the media asset being presented the user equipment. For example, the media guidance application may analyze the ambient sound to determine the ambient sound includes user conversation related to the media asset currently being consumed and accordingly, determine that there is user activity at the user equipment.

Conventional systems may, upon detecting no activity at a given device for a pre-defined period of time, switch the given device to a power-saving mode without taking into account user activity that may have occurred at another user device associated with the given user device. For example, conventional systems may switch a television off upon detecting no activity at the television for ninety minutes. However, a user may have been actively consuming content via the television when the television was switched off. For example, a DVR may have been streaming content to the television and there may have been user activity at the DVR indicative of user engagement in the content. In order to improve upon conventional system, the media guidance application may, in some embodiments, monitor for user activity at multiple related devices when determining whether to perform a power management process at any device of the multiple devices.

The media guidance application may, when monitoring for user activity at multiple related devices, monitor command signals (e.g., IR command signal, audio command signals and other suitable command signals) sent to any device of the multiple devices. For example, the media guidance application may, when determining whether to turn of the television, monitor both IR signals addressed to the television (e.g., transmitted from a television remote) and IR signal addressed to the DVR (e.g., transmitted from a DVR remote). The media guidance application may, upon detecting a signal at a first device of the multiple device, determine that an indicator of user activity has been received for a second device of the multiple device. For example, the media guidance application may determine that no IR commands were issued to the television during a pre-defined period of time but an IR command was issued to the DVR during the pre-defined period of time. Accordingly, the media guidance application may determine that user activity for the television-DVR media system has been detected and refrain from switching off the television. In some embodiments, a first device may be connected to a second device through High-Definition Multimedia Interface (HDMI) and Consumer Electronics Control (CEC) feature of HDMI, which allows a user to control both the first device and the second device through a single remote, may be enabled. In such instances, the media guidance application may monitor the HDMI-CEC commands when determining whether there has been user activity at the either the first device or the second device.

In some embodiments, the media guidance application may determine that an indicator of user activity has been detected upon determining that a user of the user equipment device has updated, while media asset 104 is being presented at user equipment device 102, a social media platform with information about the media asset 104. Specifically, the media guidance application may determine, based on accessing a data structure associated with the user equipment device, a user identifier for a user associated with the user equipment device. A user identifier for a given user is a unique identifier associated with the given user such as a string of characters or bio-metric data (e.g., finger print, retina scan, voice recognition or another suitable bio-metric data). For example, the media guidance application may access a current user data structure, located at any of storage 408, media content source 516 and media guidance data source 518, that is associated with the user equipment device and retrieve the user name "John Smith." The media guidance application may determine, based on the user identifier, a user profile associated with the user associated with the user equipment device. For example, the media guidance application may query, using database management languages (e.g., SQL, JAPQL, CODASYL or another suitable language), a user profile database for a user profile associated with "John Smith." The query result may include a unique or specific identifier associated with the user profile for "John Smith" or a pointer or link to the user profile for "John Smith," which the media guidance application may use to retrieve the user profile for "John Smith". In some embodiments, the media guidance application may receive the user profile for "John Smith" itself in response to the query.

The media guidance application may determine, based on accessing the user profile associated with the user, a social media account associated with the user. For example, the media guidance application may access the user profile for "John Smith" and query for social media accounts associated with the user profile for "John Smith." As an illustrative example, the media guidance application may determine a Facebook account associated with "John Smith." The media guidance application may determine, based on accessing the social media account associated with the user, whether the user updated the social media account with information about the media asset currently being presented while the media asset was being presented. For example, the media guidance application may access a data structure associated with the user equipment device to retrieve a time stamp corresponding to a start time of the presentation of media asset 104. The media guidance application may also retrieve a time stamp corresponding to a current time. Time stamp may be the format "Month, Day, Year, Hour: Minute: Second." For example, the media guidance application may retrieve time stamp of "Mar. 3, 2017, 09:00:00" corresponding to the start time of the presentation of the media asset and time stamp of "Mar. 3, 2017, 09:45:00" corresponding the current time. The media guidance application may query the social media account for updates made in between "Mar. 3, 2017, 09:00:00" and "Mar. 3, 2017, 09:45:00" that relate to media asset 104 currently being presented at the user equipment device (e.g., "Star Wars: Episode V"). As an illustrative example, the media guidance application may use SQL SELECT command (e.g., SELECT*FROM "John Smith's Facebook account" WHERE ("update time stamp">"Mar. 3, 2017, 09:00:00") AND ("update time stamp"<"Mar. 3, 2017, 09:45:00") AND ("update text"="Star Wars: Episode V")) to perform the query.

The media guidance application may, in response to determining that the user updated the social media account with information about the media asset currently being presented while the media asset was being presented, determine that an indicator of user activity is detected. For example, the media guidance application may determine, based on a positive query result, that John Smith updated his Facebook account with the update "Watching Star Wars: Episode V. So good!" on Mar. 3, 2017, 09:25:00. The media guidance application may accordingly determine that activity by John Smith at user equipment device 102 has been detected. In some embodiments, the media guidance application may perform semantic analysis on the update about media asset 104 currently being presented to determine whether the update is an indicator of user activity. As an illustrative example, the media guidance application may disregard the update "Tried watching Star Wars: Episode V. It was so bad that I had to turn off the TV." on Mar. 3, 2017, 09:25:00.

The media guidance application may determine, based on data from the monitoring for indicators of user activity, that user inactivity time is greater than a threshold inactivity time, where the user inactivity time corresponds to a duration of time from a time corresponding to a last detected indicator of user activity at the user equipment device to a current time. For example, the media guidance application may maintain a user inactivity time counter in the format "hour:minutes:second." The media guidance application may reset user inactivity time counter to zero (i.e., 00:00:00) every time a user activity is detected. The media guidance application may increment the user inactivity time counter based on a clock signal associated with user equipment device 102 or some other reference clock. For example, the media guidance application may determine that the current value of the user inactivity time counter is (1:01:00). The media guidance application may access a data structure associated with user equipment device 102 (e.g., default parameters data structure located at any of storage 408, media content source 516 and media guidance data source 518) to retrieve the threshold inactivity time. For example, the threshold inactivity time may be (01:00:00). The media guidance application may determine, based on comparing the threshold inactivity time with the current value of the user inactivity time counter, that the user inactivity time is greater than a threshold inactivity time.

The media guidance application may determine a media asset currently being presented at the user equipment device. For example, the media guidance application may access a data structure associated with a playback application currently being executed at user equipment device 102 to retrieve an identifier corresponding to media asset 104 that the playback application is presenting. The media asset identifier can be, but is not limited to media asset title, media asset program ID or any other suitable identifier. For example, the media guidance application may determine that media asset 104 currently being presented at user equipment device 102 is "Star Wars: Episode V." The media guidance application may determine, based on accessing a data structure associated with media asset 104, a start time corresponding to a start point of media asset 104 and an end time corresponding to the end point of media asset 104. For example, the media guidance application may access a data structure associated with "Star Wars: Episode V" to retrieve a time stamp corresponding to a time when playback of "Star Wars: Episode V" was started at user equipment device 102 (e.g., "Mar. 3, 2017, 09:00:00") and a time stamp corresponding to a time when playback of "Star Wars: Episode V" will end at user equipment device 102 (e.g., "Mar. 3, 2017, 11:00:00"). In some embodiments, the media guidance application may retrieve a length of the "Star Wars: Episode V" from the data structure associated with "Star Wars: Episode V." In some embodiments, the media guidance application may access metadata associated "Star Wars: Episode V" to determine (e.g., using suitable metadata extraction techniques) the length of "Star Wars: Episode V." In some embodiments, the media guidance application may compute the end time for "Star Wars: Episode V" based on the start time for "Star Wars: Episode V" and the length of "Star Wars: Episode V."

The media guidance application may determine, based on comparing the current time with the end time for the media asset, that the end point for the media asset currently being presented has not been reached. For example, the media guidance application may determine based on comparing time stamp corresponding to current time (e.g., "Mar. 3, 2017, 09:45:00") and time stamp corresponding to end time for media asset 104 (e.g., "Mar. 3, 2017, 11:00:00"), that the end point of media asset 104 has not been reached. The media guidance application may, in response to determining that the end point for media asset 104 has not been reached, determine, based on the current time and the start time, a playback duration for which media asset 104 has been presented. For example, the media guidance application may compute, based on time stamp corresponding to current time (e.g., "Mar. 3, 2017, 09:45:00") and time stamp corresponding to when playback of media asset 104 was started at user equipment device 102 (e.g., "Mar. 3, 2017, 09:00:00"), media asset 104 has been played back for forty-five minutes.

The media guidance application may determine, based on comparing the playback duration with a threshold playback duration, whether the playback duration exceeds the threshold playback duration. For example, the media guidance application may access a data structure (e.g., default parameters data structure) to retrieve the threshold playback duration. For example, the threshold playback duration may be thirty minutes. Following from the previous example, where media asset 104 was played back for forty-five minutes, the media guidance application may determine that the playback duration of media asset 104 exceeds the threshold playback duration. The media guidance application may, in response to determining that the playback duration exceeds the threshold playback duration, continue monitoring for indicators of user activity at the user equipment device until the end time is reached. For example, the media guidance application may continue monitoring for indicators of user activity at user equipment device 102 until time stamp corresponding to current time matches a time stamp corresponding to end point 106 of media asset 104 at user equipment device 102 (e.g., "Mar. 3, 2017, 11:00:00"). In some embodiments, the media guidance application may continue monitoring for indicators of user activity at user equipment device 102 until the media guidance application detects that current progress point indicator 108 in media asset 104 coincides with the end point 106 of media asset 104.

The media guidance application may determine whether playback duration of media asset 104 exceeds a threshold playback duration to determine whether the playback duration of media asset 104 is a significant contributor to the user inactivity time. For example, if media asset 104 has been presented for only five minutes, media asset 104 is not a significant contributor to total the user inactivity time and the user inactivity cannot reliably be attributed to engagement in media asset 104. On the other hand, if a media asset 104 has been presented for fifty minutes, playback duration of media asset 104 is a significant contributor to the user inactivity time and user inactivity may plausibly be due to engagement in the given media asset. In cases where playback duration of media asset 104 is a significant contributor to the user inactivity time, the media guidance application may wait until end point 106 of media asset 104 is reached to perform a power management process to avoid disrupting the user's consumption of media asset 104.

In some embodiments, the media guidance application may determine whether media asset 104 currently being presented at user equipment device 102 is a significant contributor to the user inactivity time based in part on an attribute associated with media asset 104. For example, the threshold playback duration may vary based on media asset 104 currently being presented. As an illustrative example, a media asset that typically engages a user rapidly (e.g., a fast-paced sci-fi movie) may need to be consumed for a shorter period of time than a media asset that requires longer time to engage a user (e.g., a serious documentary) to be considered a significant contributor to the user inactivity time. Specifically, the threshold playback duration may be based in part on an attribute associated with the media asset currently being presented. For example, the threshold playback duration for "Star Wars: Episode V" may be thirty minutes but the threshold playback duration for documentary about polar bears may be fifty minutes. An attribute associated with the media asset can be, but in not limited to, genre of media asset, length of media asset, content rating, actor, director, plotline, and setting.

In some embodiments, the threshold inactivity time may vary based on a user associated with user equipment device 104. For example, different users may have different media consumption habits. A first user may typically be inactive while consuming media assets. As a result, for the first user, long periods of inactivity at the user equipment device may not necessarily indicate that the first user is not using the user equipment device. A second user may typically be active (e.g., frequent channel changes, moving around and other suitable actions) while consuming media assets. As a result, for the second user, long periods of inactivity at the user equipment device may indicate that the second user is not using the user equipment device. Specifically, the threshold inactivity time may be based in part on a user profile data structure corresponding to a user associated with the user equipment device. As an illustrative example, at a given point in time, the media guidance application may determine, based on accessing a current user data structure associated with the user equipment device, that the current user of the user equipment device is "John Smith." The media guidance application may access John Smith's user profile and query for John Smith's media consumption habits. The media guidance application may determine the threshold inactivity time for John Smith based on John Smith's media consumption habits. For example, John Smith may typically be inactive while consuming media assets and the media guidance application may retrieve a threshold inactivity time of sixty minutes for John Smith. For example, at another point in time, the media guidance application may determine, based on accessing a current user data structure associated with the user equipment device, that the current user of the user equipment device is "Mary Smith." The media guidance application may access Mary Smith's user profile to determine the threshold inactivity time for Mary Smith. For example, Mary Smith may typically be active while consuming media assets and the media guidance application may retrieve a threshold inactivity time of thirty minutes for Mary Smith.

The media guidance application may determine, based on data from the monitoring for indicators of user activity at the user equipment device until the end time is reached, an updated user inactivity time. For example, the media guidance application may update the user inactivity time counter, in manners discussed previously in relation to determining user inactivity time, based on data from the monitoring for indicators of user activity until time stamp corresponding to current time matches a time stamp corresponding to end point 106 of media asset 104 at user equipment device 102 (e.g., "Mar. 3, 2017, 11:00:00"). For example, no indicators of user activity may be detected while monitoring until end point 106 of media asset 104. Following from the previous example, where user inactivity time counter was (1:01:00) when current time stamp was "Mar. 3, 2017, 09:45:00," the media guidance application may determine that the user inactivity time counter is (2:16:00) at current time stamp "Mar. 3, 2017, 11:00:00." The media guidance application may determine, based on comparing the updated user inactivity time with the threshold inactivity time, that the updated inactivity time exceeds the threshold inactivity time. The media guidance application may, in response to determining that the user inactivity exceeds the threshold inactivity time, perform a power management process to reduce power consumption of the user equipment device. For example, the media guidance application may retrieve, from a default parameters data structure associated with user equipment device 102 or a user profile data structure corresponding to a user associated with user equipment device 102, the threshold inactivity time (e.g., (01:00:00)). For example, the media guidance application may determine, based on executing an appropriate Boolean comparison function, that the user inactivity time counter of (2:16:00) exceeds the threshold inactivity time of (01:00:00) and accordingly, the media guidance application may perform a power management process.

In some embodiments, the media guidance application may, when performing a power management process, stop execution of a particular application, power-off devices or switch devices to low power modes. Specifically, in some embodiments, the media guidance application may, when performing a power management process, terminate a content streaming application at the user equipment device. The media guidance application may access a data structure associated with user equipment 102 to retrieve an identifier for an application that is providing media asset 104. As an illustrative example, the media guidance application may determine that media asset 104 is being presented through a video-on-demand streaming application (e.g., Amazon Prime Instant Video) and the media guidance application may terminate the video-on-demand streaming application. In some embodiments, user equipment 102 may be receiving a live broadcast program via a tuner tuned to the source of the live broadcast program. The media guidance application may, when performing a power management process, free up the tuner so that the number of inactive tuners available to other users increases. In some embodiments, the media guidance application may, when performing a power management process, power-off the user equipment device. For example, the media guidance application may turn off user equipment device 102.

In some embodiments, the media guidance application may, when performing a power management process, switch the user equipment device to a low power mode. For example, the media guidance application may turn user equipment device 102 to a power-saving (e.g., screen saver mode) or sleep mode instead of completely powering user equipment device 102 down. In some embodiments, the media guidance application may, upon turning user equipment device 102 to a low-power mode, initiate recording of media asset currently being presented at user equipment device 102. In some embodiments, the media guidance application may detect that a user has left a viewing area associated with user equipment device 102. In response, the media guidance application may switch user equipment device 102 to low power mode and start recording the media asset currently being presented at user equipment device 102 on a recording device associated with user equipment device 102. In some embodiments, the media guidance application may, when performing a power management process, power-off another user equipment device that is associated with the user equipment device. In some embodiments, the media guidance application may, when performing a power management process, switch the another user equipment to a low power mode. The media guidance application may access a data structure associated with user equipment device 102 to retrieve identifiers for other user equipment devices associated with user equipment device 102. For example, user equipment device 102 may be a television and the media guidance application may determine that a surround sound speaker system is associated with the user equipment device 102. For example, the media guidance application may either turn another user equipment device (e.g., surround sound speaker system) associated with user equipment device 102 off or the media guidance application may set the another user equipment device to power-saving or sleep mode.

In some embodiments, the media guidance application may, when performing the power management process, display a notification that requests a user input. In some embodiments, the media guidance application may, when performing the power management process, generate an audio notification that requests a user response (e.g., Ask the question "Are you there?" via a smart speaker such as Alexa™). The media guidance application may detect that no user input is received within a pre-defined interval after the notification is generated and accordingly, the media guidance application may power off the user equipment device.

Specifically, the media guidance application may generate for display, on a display device associated with the user equipment device, a notification, where the notification requests a user input. For example, the media guidance application may display, on a display associated with user equipment device 102, a notification 110 (e.g., "Are you still watching?") along with a user selectable option 112 (e.g., "Yes"). The media guidance application may generate for display the notification 110 at time 150 upon determining that end point 106 for media asset 104 has been reached.

The media guidance application may determine whether the user input is received within a pre-defined user response time interval from a time when the notification is displayed. For example, the media guidance application may start incrementing, based on a reference clock, a response time counter, initialized at zero, from the time the notification is displayed. The media guidance application may set the response time counter to zero upon receiving the user input via user input interface 410. As an illustrative example, the response time counter may be in the format (hour: minute: second). The media guidance application may access a data structure associated with user equipment device 102 (e.g., default parameters data structure) to retrieve the pre-defined user response time interval (e.g., one minute). For example, the media guidance application may detect that the selectable option 112 (e.g., "yes") has not been selected within one minute and one second after the display of notification 110. The media guidance application may accordingly increment the value of the response time counter to (00:01:01). The media guidance application may determine, based on executing an appropriate Boolean comparison function, that the response time counter (e.g., (00:01:01)) exceeds the pre-defined user response time interval (e.g., (00:01:00) or one minute). Accordingly, the media guidance application may determine the user input (e.g., selection of selectable option 112) is not received within the pre-defined user response time interval. The media guidance application may, in response to determining that the user input is not received within the pre-defined user response time interval, power off the user equipment device.

In some embodiments, the media guidance application may, prior to displaying notification 110, determine the next unimportant segment in a media asset currently being displayed and display the notification during the next unimportant segment. In some embodiments, the media guidance application may determine whether a segment is unimportant based on the current user of user equipment device 102 and an attribute of the media asset. In some embodiments, the media guidance application may determine that a segment in a media asset is advertisement content and may determine the advertisement content segment is unimportant. Specifically, the media guidance application may, when generating for display a notification, determine, based accessing a data structure associated with a different media asset currently being presented, a next segment in the different media asset that is associated with an importance score below a threshold importance score. The media guidance application may generate for display the notification during the next segment in the different media asset.

In some embodiments, a media asset currently being consumed may be streamed from a first user equipment (e.g., a set-top box) to a second user equipment (e.g., a mobile device). Current progress point within the media asset at the first user equipment may be different from the Current progress point within the media asset at the second user equipment. For example, the set-top box may be streaming a live broadcast program but the version received by the mobile device may have a buffer to allow playback adjustment features (pause, rewind, and other features). The user may pause the program at the mobile device and then resume playback, resulting in the current progress within the program at the mobile device being behind the current progress within the program at the set-top box. The media guidance application may, when determining next unimportant segment during which to generate a notification, determine the next unimportant segment based on current progress point within the media asset at the user equipment at which the media asset is being presented to the user. For example, the media guidance application may determine that the live broadcast program is being presented to the user at the mobile device and use the current progress point within the live broadcast program at the mobile device to determine the next unimportant segment.

A media asset may include multiple segments. Each segment of the media asset may further include multiple frames. A segment in the media asset may be defined by time codes corresponding to the start frame and the end frame of the segment. For example, a time code associated with a frame of the media asset may be in the format (hour: minute: second: frame) where (hour: minute: second) portion indicates an amount of time elapsed from start point of the media asset and (frame) identifies a frame associated with point in time indicated by the (hour: minute: second) portion. For example, the media asset "Big Bang Theory" may be presented after the end of media asset "Star Wars: Episode V." "Big Bang Theory" may include a re-cap segment with start and end frames (00:00:00:00) and (00:00:01:00) respectively. The re-cap segment in "Big Bang Theory" may be followed by an opening credits segment with start and end frames (00:00:01:01) and (00:00:02:00) respectively. A data structure or metadata associated with a media asset may include information about start frame and end frame for a given segment of a media asset and importance score for the given segment of the media asset.

Importance score for a given segment in a media asset is an indication of how crucial the given segment is to the media consumption experience of the media asset. In some embodiments, importance score may be fuzzy logic variables such as "very important," "moderately important" and "not important." In some embodiments, the importance score may be a numerical value (e.g., five) on a pre-defined scale (e.g., scale ranging from zero to ten where zero corresponds to lowest possible importance and ten corresponds to highest possible importance). As an illustrative example, the re-cap segment in "Big Bang Theory" may have an importance score of six whereas the opening credits segment may have an importance score of two. The media guidance application may access a default parameters data structure to retrieve the threshold importance score. For example, the threshold importance score may be five. The media guidance application may compare, in sequential order of segments in a given media asset, importance score of the segments in the given media asset with the threshold importance score to determine the next segment that has a importance score less than the threshold importance score. For example, the media guidance application may determine the next segment in "Big Bang Theory" with importance score (e.g., two) less than the threshold importance score (e.g., five) is the opening credits segment. Accordingly, the media guidance application may generate for display notification 110 requiring user input (e.g., "Are you still watching?" with selectable option 112) during the opening credits segment of "Big Bang Theory."

In some embodiments, the media guidance application may determine that that user inactivity time exceeds the threshold inactivity time and playback duration of media asset 104 currently being consumed does not exceed the threshold playback duration. In such an instance, the media guidance application may perform a power management process during the playback of media asset 104. In some embodiments, the media guidance application may generate for display notification 110 along with user selectable option 112 during the playback of media asset 104. The media guidance application may, in manners described previously in relation to determining next unimportant segment in a media asset, display notification 110 user selectable option 112 during the next unimportant segment in media asset 104.

In some embodiments, the threshold importance score may be a variable so that the media guidance application can use a more stringent criteria when determining next unimportant segment of a media asset that a user cares about. Specifically, the threshold importance score may be based in part on a user profile data structure corresponding to a user associated with the user equipment device and an attribute associated with the different media asset currently being presented. For example, the media guidance application may determine, based on accessing current user data structure associated with user equipment device 102, that the user associated with user equipment device 102 is "John Smith." The media guidance application may access John Smith's user profile data structure, in manners described previously, to determine John Smith's media consumption preferences. Media consumption preferences can be, but is not limited to, genre, actors, content rating, directors, plotline, and setting. The media guidance application may determine, based on accessing a data structure or metadata associated with a given media asset, attributes associated with the given media asset. The media guidance application may then compare the attributes associated with the given media asset with a user's media consumptions preferences to determine a level of similarity of the given media asset is to the user's preferred media assets. The media guidance application may then compute the threshold importance score as a function of the level of similarity of the given media asset to the user's preferred media assets.

As an illustrative example, the media guidance application may use a formula such as [(default threshold importance score+constant A*(constant B−level of similarity of a given media asset to the user's preferred media assets)] to compute the threshold importance score for a given media asset. As an illustrative example, the values for default threshold importance score, constant A and constant B may be five, five and one-half respectively (i.e., the formula may be [(5+5*(½−level of similarity of a given media asset to the user's preferred media assets)]. The level of similarity of a given media asset to the user's preferred media assets may be defined as a percentage.

As an illustrative example, the different media asset may be "Big Bang Theory" which is a comedy sitcom. The media guidance application may determine that user John Smith's media consumption preferences includes comedy sitcoms and accordingly, the media guidance application may compute a eighty percent level of similarity between "Big Bang Theory" and John Smith's preferred media assets. The media guidance application may then compute the threshold importance score to be 3.8. As another illustrative example, when the user associated with user equipment device 102 is Mary Smith, the media guidance application may determine that the user Mary Smith's media consumption preferences includes documentary films but no comedy sitcoms. In this case, the media guidance application may compute a ten percent level of similarity between "Big Bang Theory" and Mary Smith's preferred media assets. The media guidance application may then compute the threshold importance score to be seven. Following from the previous example, where re-cap segment of "Big Bang Theory" has an importance score of six and the opening credits segment has an importance score of two, the media guidance application may generate for display the notification during the opening credits segment when the user is John Smith and during the re-cap segment when the user is Mary Smith.

In some embodiments, the media guidance application may, when performing the power management process, transmit a video signal to a display device associated with user equipment device 102 and determine whether a display on the display device, after the video signal transmission, matches an expected display (i.e., "video signal check"). The media guidance application may, upon determining that the display on the display device associated with user equipment device 102 does not match the expected display, automatically power off user equipment device 102. Specifically, the media guidance application may transmit a video signal from the user equipment device to a display device associated with the user equipment device. For example, the media guidance application may transmit a video signal for an overlay "This is a test." to a display screen associated with user equipment device 102. The media guidance application may monitor, using a first sensor device, display at the display screen following the transmission of the video signal. For example, the media guidance application may use an image capture device (e.g., a camera) to capture a series of images that are displayed on the display screen associated with user equipment device 102 after the video signal is transmitted to the display screen.

The media guidance application may determine, based on comparing data received from the first sensor device with the transmitted video signal, whether an image displayed at the display device associated with the user equipment device matches an image included in the transmitted video signal. As an illustrative example, the media guidance application may access a data structure associated with the video signal, located at any of storage 408, media content source 516 and media guidance data source 518, to retrieve a video frame (i.e., the expected image) of the video signal. The media guidance application may fingerprint the retrieved video frame to create a fingerprint for the video frame. As a non-limiting example, the media guidance application may, when fingerprinting the retrieved video frame, use a hashing algorithm (e.g., a-hash, p-hash, d-hash, w-hash and other suitable hashing algorithm) to compute a "video frame hash." Similarly, the media guidance application may retrieve an image of the display presented on the display screen associated with user equipment device 104 that was captured by the image capture device following the transmission of the video signal. The media guidance application may fingerprint, in manners described previously, the retrieved captured image. For example, the media guidance application may compute a "captured image hash." The media guidance application may determine, by executing a program script that takes two numerical values as inputs and outputs whether the two values are a match based on how similar the two values are, whether the "captured image hash" matches the "video frame hash." Following from the previous example, the video frame may be for an overlay "This is a test." As a matter of example, display screen associated with user equipment device 104 may be turned off when the video signal is transmitted. Consequently, the captured image of the display screen may be of a blank display screen. As a result, "video frame hash" and "captured image hash" may be very different and the media guidance application may determine that "video frame hash" and "captured image hash" are not a match.

The media guidance application may, in response to determining that the image displayed at the display device does not match the image included in the transmitted video signal, automatically, without any user input, power off the user equipment device. For example, the media guidance application may, after determining that "video frame hash" and "captured image hash" are not a match, automatically turn off user equipment device 102 without requesting any further user input. In some embodiments, the media guidance application may automatically switch user equipment device 102 to a low-power operation mode instead of powering it off completely.

In some embodiments, the media guidance application may, when performing the power management process, transmit an audio signal to an audio device associated with user equipment device 102 and determine whether a sound emitted by the audio device, following the transmission of the audio signal, matches an expected sound (i.e., "audio signal check"). The media guidance application may, upon determining that the sound emitted by the audio device does not match an expected sound, automatically power off user equipment device 102. In some embodiments, the media guidance application may transmit an audio signal to an audio device associated with user equipment device 102 upon determining that a display on a display device associated with the user equipment device did not match an expected display.

Specifically, the media guidance application may, in response to determining that the image displayed at the display device does not match the image included in the transmitted video signal, transmit an audio signal from the user equipment device to an audio device associated with the user equipment device. For example, the media guidance application may transmit an audio signal for "Hello!" to a speaker associated with user equipment device 102. In some embodiments, the audio signal may be in frequency range that is not audible to humans. The media guidance application may monitor, using a second sensor device, audio at the audio device following the transmission of the audio signal. For example, the media guidance application may use a sound detector to capture the sound that is emitted by the speaker after the audio signal is transmitted to the speaker.

The media guidance application may determine, based on comparing data received from the second sensor device with the transmitted audio signal, whether a sound pattern received from the audio device matches a sound pattern included in the transmitted audio signal. As an illustrative example, the media guidance application may access a data structure associated with the audio signal, located at any of storage 408, media content source 516 and media guidance data source 518, to retrieve a sound signature (i.e., the expected sound) for the audio signal. As an illustrative example, the sound signature for the audio signal may be the frequency makeup of the audio signal. The media guidance application may retrieve, from the data received from the sound detector, the sound emitted by the speaker following transmission of the audio signal to the speaker (i.e., sound pattern received from the audio device). The media guidance application may determine a sound signature of the sound emitted by the speaker following transmission of the audio signal to the speaker. As an illustrative example, the media guidance application may execute a program script that receives a sound signal as an input and returns Fast Fourier transform (FFT) of the sound signal to determine the sound signature of the sound emitted by the speaker.

The media guidance application may determine, by executing a program script that takes two different frequency make-ups as inputs and outputs whether the two frequency make-ups are a match based on how similar the two frequency make-ups are, whether the sound signature of the audio signal matches the sound signature of the sound emitted by the speaker. Following from the previous example, the audio signal may be the sound "Hello." As a matter of example, the speaker may be turned off when the audio signal is transmitted. Consequently, there may be no sound emitted by the speaker. As a result, sound signature of the audio signal and the sound signature of the sound emitted by the speaker may be very different and the media guidance application may determine that the audio signal and the sound emitted by the speaker are not a match. The media guidance application may, in response to determining that the sound pattern received from the audio device does not match the sound pattern included in the transmitted audio signal, automatically, without any user input, power off the user equipment device. Upon determining that the audio signal and the sound emitted by the speaker are not a match, the media guidance application may automatically turn off the set-top box without requesting any further user input. In some embodiments, the media guidance application may automatically switch the set-top box to a low-power operation mode instead of powering it off completely.

In some embodiments, the media guidance application may use the audio signal check to determine whether a user equipment is switched off and needs to be switched on. For example, the media guidance application may, upon detecting a DVR has started playing back a media asset, transmit an audio signal to a television connected to the DVR. The media guidance application may, upon detecting that sound emitted by the television does not match the transmitted audio (e.g., television is turned off and thus emits no sound), switch on the television so that the user does not have to manually switch on the television.

In some embodiments, the media guidance application may, when performing the power management process for user equipment device 102, determine another user equipment device 102 that is associated with the user of user equipment device 102 (i.e., "second device check"). Upon detecting no activity at user equipment device 102 for a threshold time, the media guidance application may send, to the other user equipment device, a notification that requests a user input. The media guidance application may detect that no user input is received at the other user equipment device within a pre-defined interval after the notification is sent and accordingly, the media guidance application may power off user equipment device 102. In some embodiments, the media guidance application may send the notification for requesting user input to the another user equipment device upon determining that an image displayed at a display device associated with user equipment device 102 does not match an image included in a video signal transmitted to the display device. In some embodiments, the media guidance application may send the notification for requesting user input to the another user equipment device upon determining that a sound emitted by an audio device associated with user equipment device 102 did not match the expected sound.

Specifically, the user equipment device may be a first user equipment device and the media guidance application may, in response to determining that the sound pattern received from the audio device does not match the sound pattern included in the transmitted audio signal, determine, based on accessing a data structure associated with the first user equipment device, a user identifier for a user associated with the first user equipment device. For example, the media guidance application may access a current user data structure associated with user equipment device 102 (e.g., a television) to retrieve the user name "John Smith." The media guidance application may determine, based on accessing a data structure associated with the user identifier, a second user equipment device associated with the user associated with the first user equipment device. For example, the media guidance application may access the user profile for "John Smith" and retrieve an identifier (e.g., mobile phone number) for a mobile device associated with "John Smith."

The media guidance application may transmit a notification to the second user equipment device, where the notification requests a user input. For example, the media guidance application may transmit a notification "Are you still using user equipment device 102?" along with a user selectable option "Yes" to John Smith's mobile device. The media guidance application may determine whether the user input is received from the second user equipment device within a pre-defined user response time interval from a time when the notification is transmitted. The media guidance application may determine, in manners described previously in relation to determining whether a response is received within a pre-defined time interval after displaying a notification on a display device associated with user equipment device 102, whether user selection of the selectable option 112 (e.g., "yes") is received at the mobile device within a pre-defined time interval (e.g., one minute after transmission of the notification to the mobile device). The media guidance application may, in response to determining that the user input is not received within the pre-defined user response time interval, power off the first user equipment device. For example, the media guidance application may determine the selectable option 112 has not been selected at the mobile device within one minute after the transmission of the notification to the mobile device. Responsively, the media guidance application may turn off user equipment device 102. In some embodiments, the media guidance application may switch the set-top box to a low-power operation mode instead of powering it off completely. In some embodiments, the media guidance application perform only the "video signal check" when performing the power management process. In some embodiments, the media guidance application perform only the "audio signal check" when performing the power management process. In some embodiments, the media guidance application perform only the "second device check" when performing the power management process. In some embodiments, the media guidance application may perform any combination of "video signal check," "audio signal check" and "second device check" when performing the power management process.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart-phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
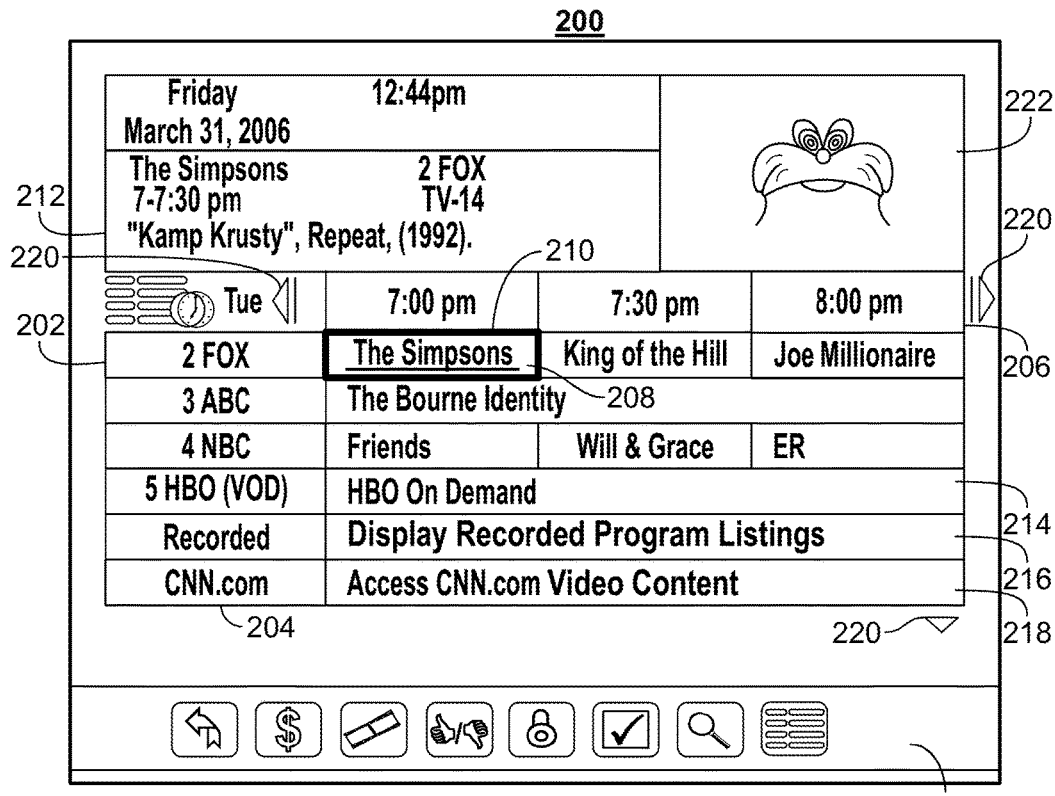
FIG. 2 shows an illustrative example of a display screen for use in accessing media content in accordance with some embodiments of the disclosure.
Figure 3:
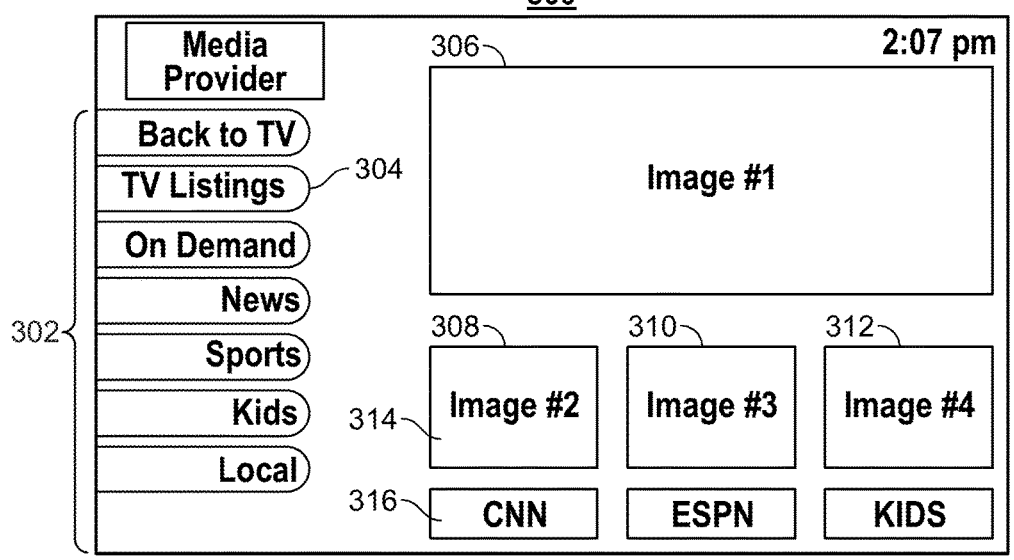
FIG. 3 shows yet another illustrative example of a display screen for use in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
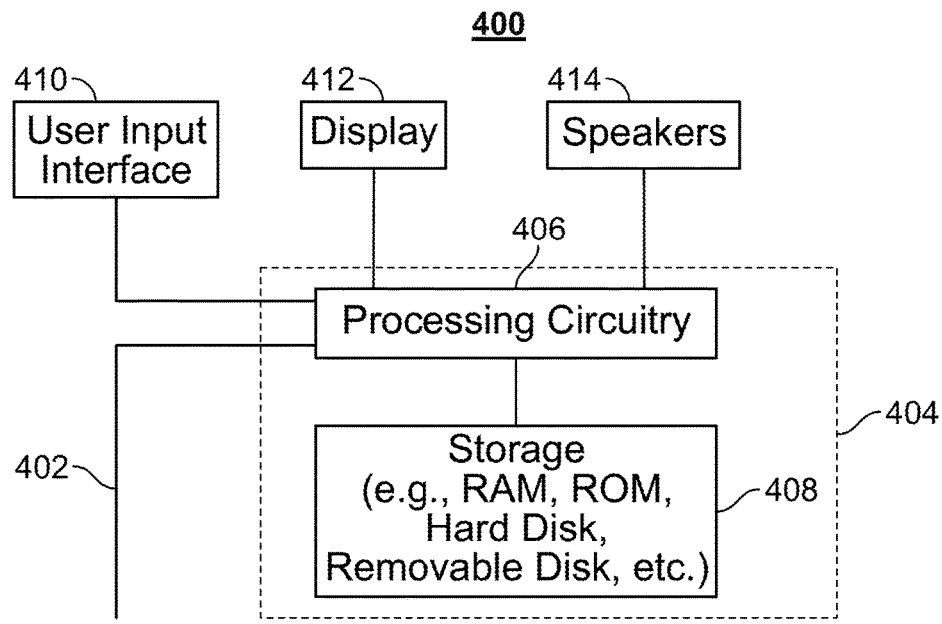
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some user television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
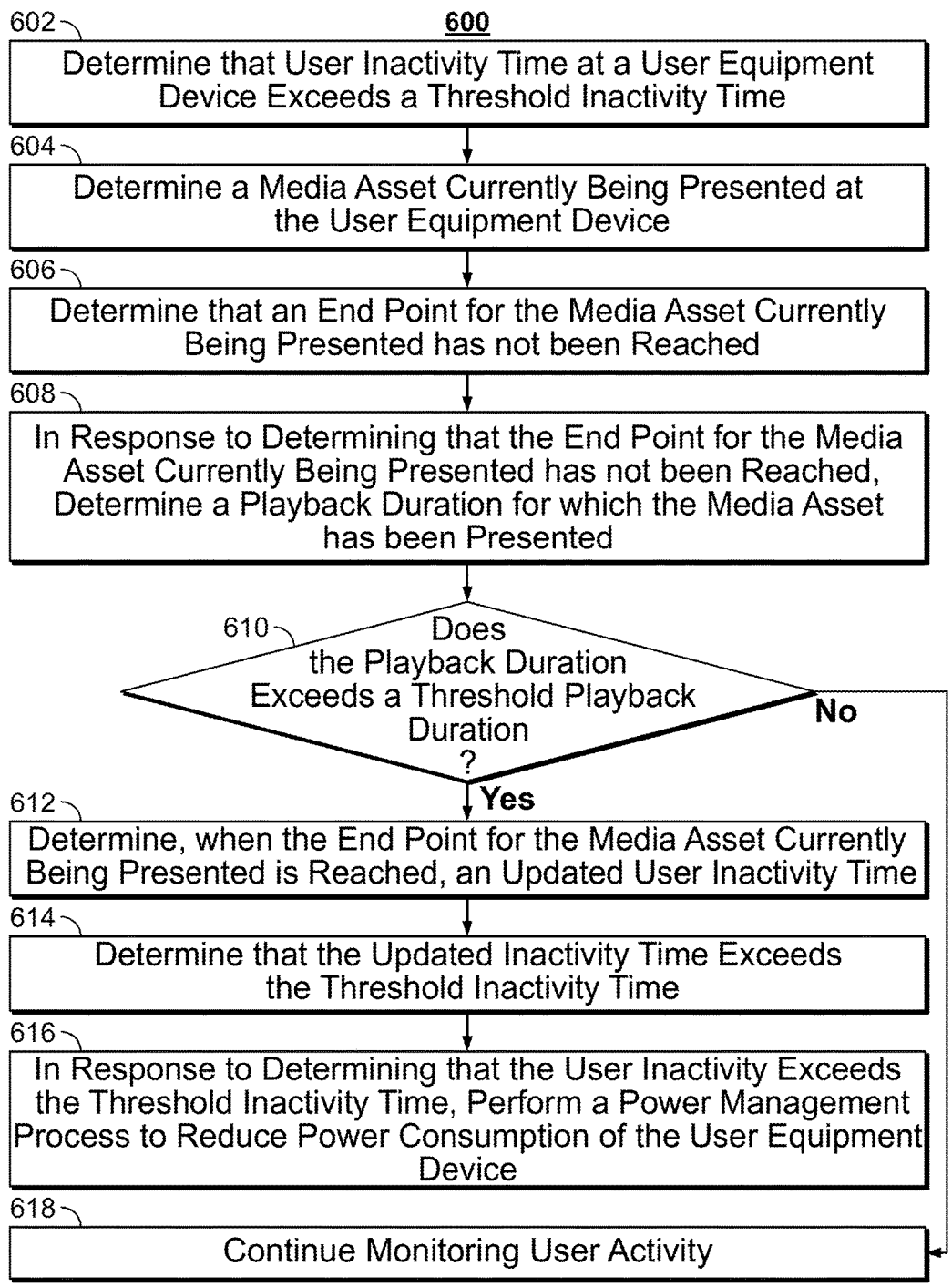
FIG. 6 is a flowchart of illustrative steps involved in performing a power management process for reducing power consumption of a user equipment device based on a portion of a media asset that has been consumed, in accordance with some embodiments of the disclosure.

FIG. 6 is a flowchart of illustrative steps involved in performing a power management process for reducing power consumption of a user equipment device based on a portion of a media asset that has been consumed, in accordance with some embodiments of the disclosure. Process 600 may be executed by control circuitry 404 (FIG. 4) as instructed by the media guidance application. Control circuitry 404 may be implemented on user equipment 502, 504, and/or 506 (FIG. 5). In addition, one or more steps of process 600 may be incorporated into or combined with one or more steps of any other process or embodiment.

Process 600 begins at 602 where control circuitry 404 determines that user inactivity time at a user equipment device exceeds a threshold inactivity time. For example, control circuitry 404 may maintain a user inactivity time counter in the format "hour: minutes: second." Control circuitry 404 may reset user inactivity time counter to zero (e.g., 00:00:00) every time a user activity is detected. Control circuitry 404 may increment the user inactivity time counter based on a clock signal associated with user equipment device 102 or some other reference clock. For example, control circuitry 404 may determine that the current value of the user inactivity time counter is (1:01:00). Control circuitry 404 may access a data structure associated with user equipment device 102 (e.g., default parameters data structure located at any of storage 408, media content source 516 and media guidance data source 518) to retrieve the threshold inactivity time. For example, the threshold inactivity time may be (01:00:00). Control circuitry 404 may determine, based on comparing the threshold inactivity time with the current value of the user inactivity time counter, that the user inactivity time is greater than a threshold inactivity time.

Process 600 continues to 604 where control circuitry 404 determines a media asset currently being presented at the user equipment device. For example, control circuitry 404 may determine a playback application currently being executed at user equipment device 102. Control circuitry 404 may access a data structure associated with the playback application to retrieve an identifier corresponding to media asset 104. Process 600 continues to 606 where control circuitry 404 determines that an end point for the media asset currently being presented has not been reached. For example, control circuitry 404 may access a data structure associated with media asset 104 to retrieve a time stamp corresponding to a time when playback of media asset 104 was started at user equipment device 102 (e.g., "Mar. 3, 2017, 09:00:00") and a time stamp corresponding to a time when playback of media asset 104 will end at user equipment device 102 (e.g., "Mar. 3, 2017, 11:00:00"). For example, control circuitry 404 may determine based on comparing time stamp corresponding to current time (e.g., "Mar. 3, 2017, 09:45:00") and time stamp corresponding to end time for media asset 104 (e.g., "Mar. 3, 2017, 11:00:00"), that the end point of media asset 104 has not been reached.

Process 600 continues to 608 where control circuitry 404, in response to determining that the end point for the media asset currently being presented has not been reached, determines a playback duration for which the media asset has been presented. For example, the media guidance application may compute, based on time stamp corresponding to current time (e.g., "Mar. 3, 2017, 09:45:00") and time stamp corresponding to when playback of media asset 104 was started at user equipment device 102 (e.g., "Mar. 3, 2017, 09:00:00"), media asset 104 has been played back for forty-five minutes. Process 600 continues to 610 where control circuitry 404 determines whether the playback duration exceeds a threshold playback duration. If, at 610, control circuitry 404 determines that the playback duration does not exceed the threshold playback duration, process 600 continues to 618. At 618, control circuitry 404 continues monitoring user activity. If, at 610, control circuitry 404 determines that the playback duration exceeds the threshold playback duration, process 600 continues to 612. At 612, control circuitry 404 determines, when the end point for the media asset currently being presented is reached, an updated user inactivity time. For example, control circuitry 404 may continue monitoring for indicators of user activity at user equipment device 102 until control circuitry 404 detects that current progress point indicator 108 in media asset 104 coincides with the end point 106 of media asset 104 and update user inactivity time counter accordingly.

Process 600 continues to 614 where control circuitry 404 determines that the updated inactivity time exceeds the threshold inactivity time. For example, no indicators of user activity may be detected while monitoring until end point 106 of media asset 104. Following from the previous example, where user inactivity time counter was (1:01:00) when current time stamp was "Mar. 3, 2017, 09:45:00," control circuitry 404 may determine that the user inactivity time counter is (2:16:00) at current time stamp "Mar. 3, 2017, 11:00:00." Control circuitry 404 may determine, based on comparing the updated user inactivity time with the threshold inactivity time, that the updated inactivity time exceeds the threshold inactivity time. Process 600 continues to 616 where control circuitry 404, in response to determining that the user inactivity exceeds the threshold inactivity time, performs a power management process to reduce power consumption of the user equipment device. For example, control circuitry 404 may determine, based on executing an appropriate Boolean comparison function, that updated user inactivity time counter of (2:16:00) exceeds the threshold inactivity time of (01:00:00) and accordingly, control circuitry 404 may power-off user equipment 102.

Figure 7:
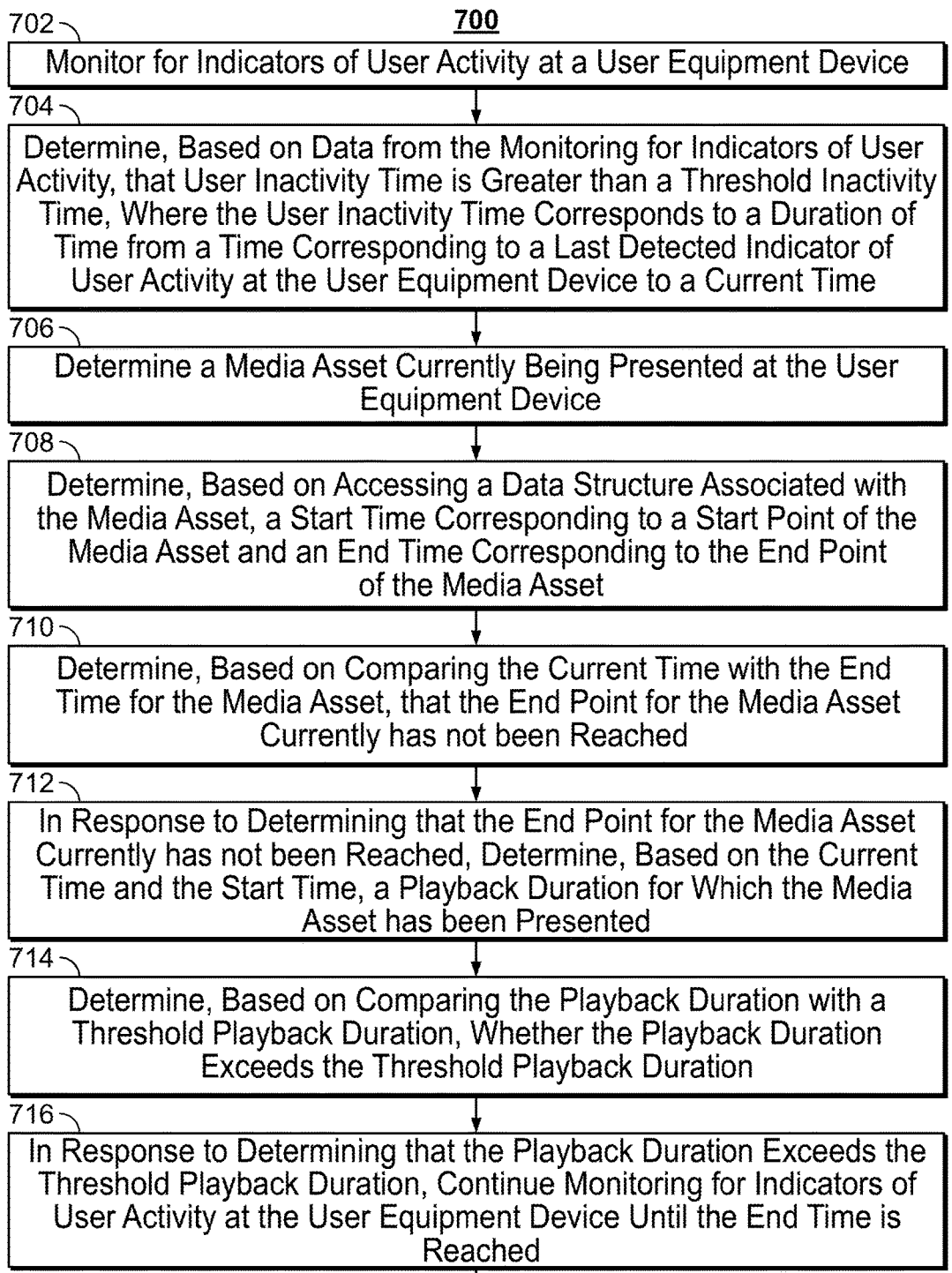
FIG. 7 is another flowchart of illustrative steps involved in performing a power management process for reducing power consumption of a user equipment device based on a portion of a media asset that has been consumed, in accordance with some embodiments of the disclosure.
Figure 7:
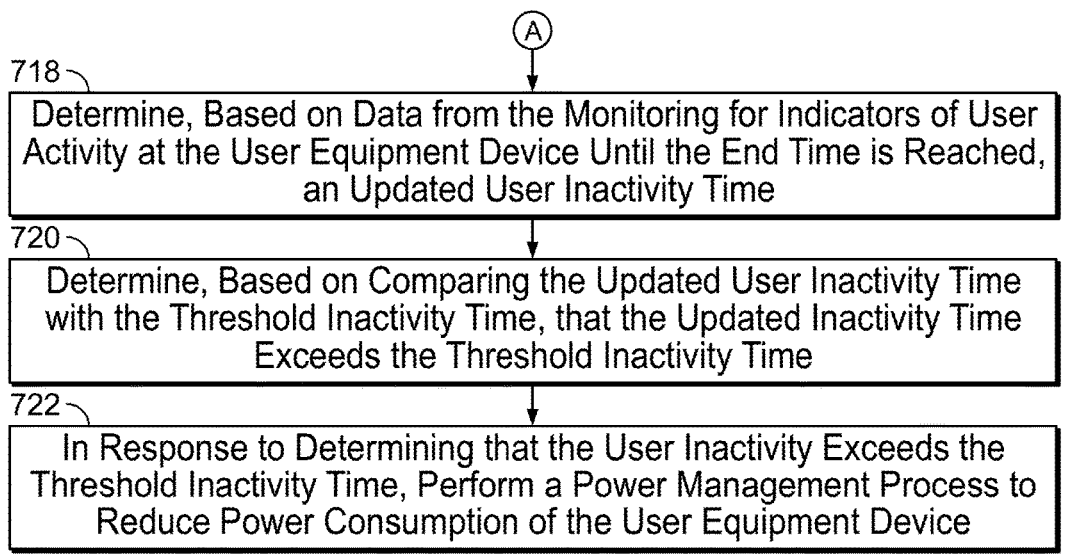

FIG. 7 is another flowchart of illustrative steps involved in performing a power management process for reducing power consumption of a user equipment device based on a portion of a media asset that has been consumed, in accordance with some embodiments of the disclosure. Process 700 may be executed by control circuitry 404 (FIG. 4) as instructed by the media guidance application. Control circuitry 404 may be implemented on user equipment 502, 504, and/or 506 (FIG. 5). In addition, one or more steps of process 700 may be incorporated into or combined with one or more steps of any other process or embodiment.

Process 700 begins at 702 where control circuitry 404 monitors for indicators of user activity at a user equipment device. For example, control circuitry 404 may monitor for actions (e.g., volume changes, playback speed changes, channel surfing, scheduling recordings and other suitable actions) performed at user equipment device 102. Process 700 continues to 704 where control circuitry 404 determines, based on data from the monitoring for indicators of user activity, that user inactivity time is greater than a threshold inactivity time, where the user inactivity time corresponds to a duration of time from a time corresponding to a last detected indicator of user activity at the user equipment device to a current time. For example, control circuitry 404 may maintain a user inactivity time counter in the format "hour:minutes:second" that is reset to zero (i.e., 00:00:00) every time a user activity is detected. For example, control circuitry 404 may determine that the current value of the user inactivity time counter is (1:01:00). Control circuitry 404 may access a data structure associated with user equipment device 102 (e.g., default parameters data structure located at any of storage 408, media content source 516 and media guidance data source 518) to retrieve the threshold inactivity time. For example, the threshold inactivity time may be (01:00:00). Control circuitry 404 may determine, based on comparing the threshold inactivity time with the current value of the user inactivity time counter, that the user inactivity time is greater than a threshold inactivity time.

Process 700 continues to 706 where control circuitry 404 determines a media asset currently being presented at the user equipment device. For example, control circuitry 404 may access a data structure associated with a playback application currently being executed at user equipment device 102 to retrieve an identifier corresponding to media asset 104 that the playback application is presenting. As an illustrative example, control circuitry 404 may determine that media asset 104 currently being presented at user equipment device 102 is "Star Wars: Episode V." Process 700 continues to 708 where control circuitry 404 determines, based on accessing a data structure associated with the media asset, a start time corresponding to a start point of the media asset and an end time corresponding to the end point of the media asset. Control circuitry 404 may determine, based on accessing a data structure associated with media asset 104, a start time corresponding to a start point of media asset 104 and an end time corresponding to the end point of media asset 104. As an illustrative example, control circuitry 404 may access a data structure associated with "Star Wars: Episode V" to retrieve a time stamp corresponding to a time when playback of "Star Wars: Episode V" was started at user equipment device 102 (e.g., "Mar. 3, 2017, 09:00:00") and a time stamp corresponding to a time when playback of "Star Wars: Episode V" will end at user equipment device 102 (e.g., "Mar. 3, 2017, 11:00:00").

Process 700 continues to 710 where control circuitry 404 determines, based on comparing the current time with the end time for the media asset, that the end point for the media asset currently has not been reached. For example, control circuitry 404 may determine based on comparing time stamp corresponding to current time (e.g., "Mar. 3, 2017, 09:45:00") and time stamp corresponding to end time for media asset 104 (e.g., "Mar. 3, 2017, 11:00:00"), that the end point of media asset 104 has not been reached. Process 700 continues to 712 where control circuitry 404, in response to determining that the end point for the media asset currently has not been reached, determines, based on the current time and the start time, a playback duration for which the media asset has been presented. For example, control circuitry 404 may compute, based on time stamp corresponding to current time (e.g., "Mar. 3, 2017, 09:45:00") and time stamp corresponding to when playback of media asset 104 was started at user equipment device 102 (e.g., "Mar. 3, 2017, 09:00:00"), media asset 104 has been played back for forty-five minutes.

Process 700 continues to 714 where control circuitry 404 determines, based on comparing the playback duration with a threshold playback duration, whether the playback duration exceeds the threshold playback duration. For example, control circuitry 404 may access a data structure (e.g., default parameters data structure) to retrieve the threshold playback duration. For example, the threshold playback duration may be thirty minutes. Following from the previous example, where media asset 104 was played back for forty-five minutes, control circuitry 404 may determine that the playback duration of media asset 104 exceeds the threshold playback duration. Process 700 continues to 716 where control circuitry 404, in response to determining that the playback duration exceeds the threshold playback duration, continues monitoring for indicators of user activity at the user equipment device until the end time is reached. For example, control circuitry 404 may continue monitoring for indicators of user activity at user equipment device 102 until time stamp corresponding to current time matches a time stamp corresponding to end point 106 of media asset 104 at user equipment device 102 (e.g., "Mar. 3, 2017, 11:00:00").

Process 700 continues to 718 where control circuitry 404 determines, based on data from the monitoring for indicators of user activity at the user equipment device until the end time is reached, an updated user inactivity time. For example, no indicators of user activity may be detected while monitoring until end point 106 of media asset 104. Following from the previous example, where user inactivity time counter was (1:01:00) when current time stamp was "Mar. 3, 2017, 09:45:00," control circuitry 404 may determine that the user inactivity time counter is (2:16:00) at current time stamp "Mar. 3, 2017, 11:00:00."

Process 700 continues to 720 where control circuitry 404 determines based on comparing the updated user inactivity time with the threshold inactivity time, that the updated inactivity time exceeds the threshold inactivity time. Process 700 continues to 722 where control circuitry 404, in response to determining that the user inactivity exceeds the threshold inactivity time, performs a power management process to reduce power consumption of the user equipment device. For example, control circuitry 404 may determine, based on executing an appropriate Boolean comparison function, that updated user inactivity time counter of (2:16:00) exceeds the threshold inactivity time of (01:00:00) and accordingly, control circuitry 404 may power-off user equipment 102.

Figure 8:
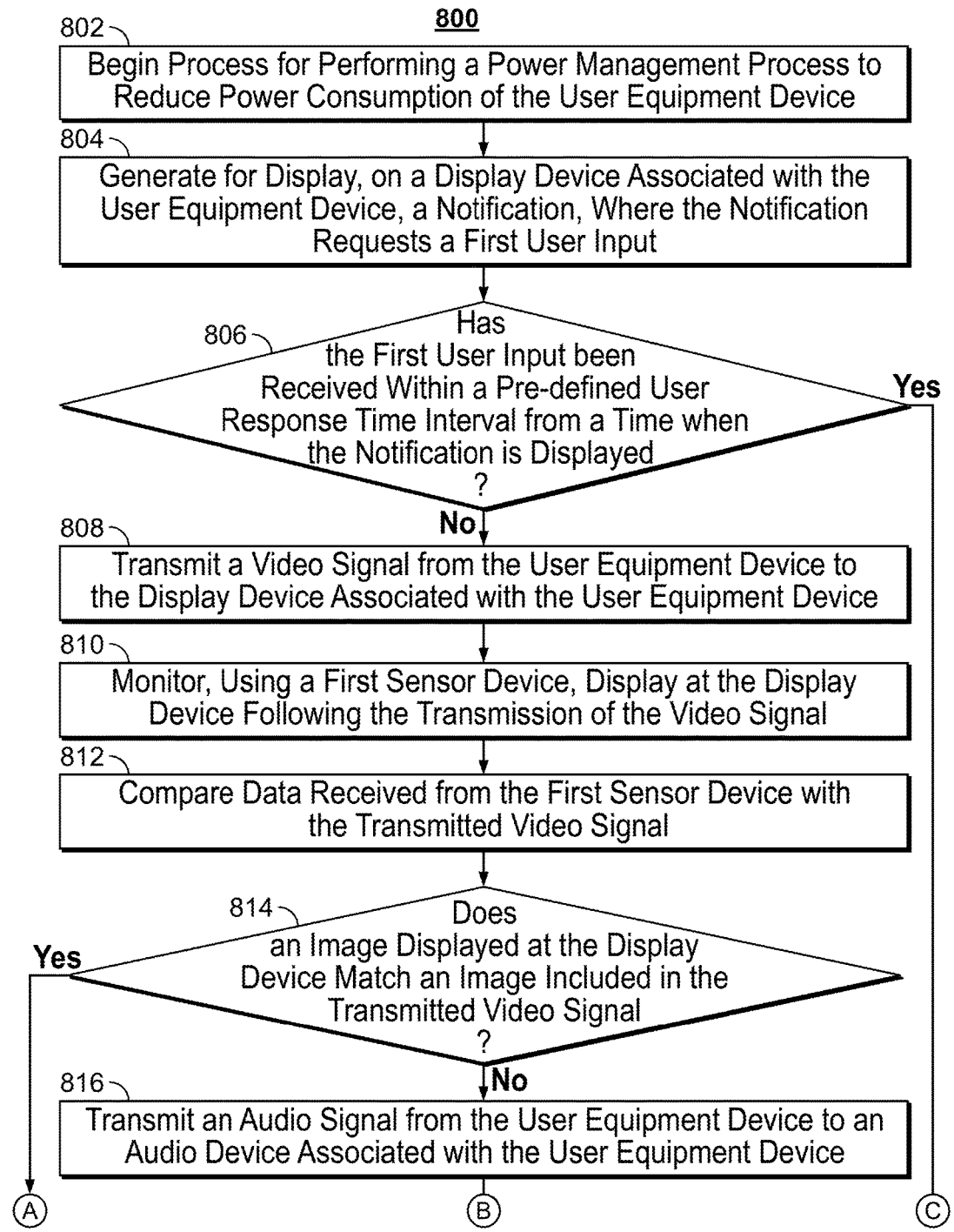
FIG. 8 is a flowchart of illustrative steps involved in determining whether to perform a power management process at a given user equipment device, in accordance with some embodiments of the disclosure.
Figure 8:
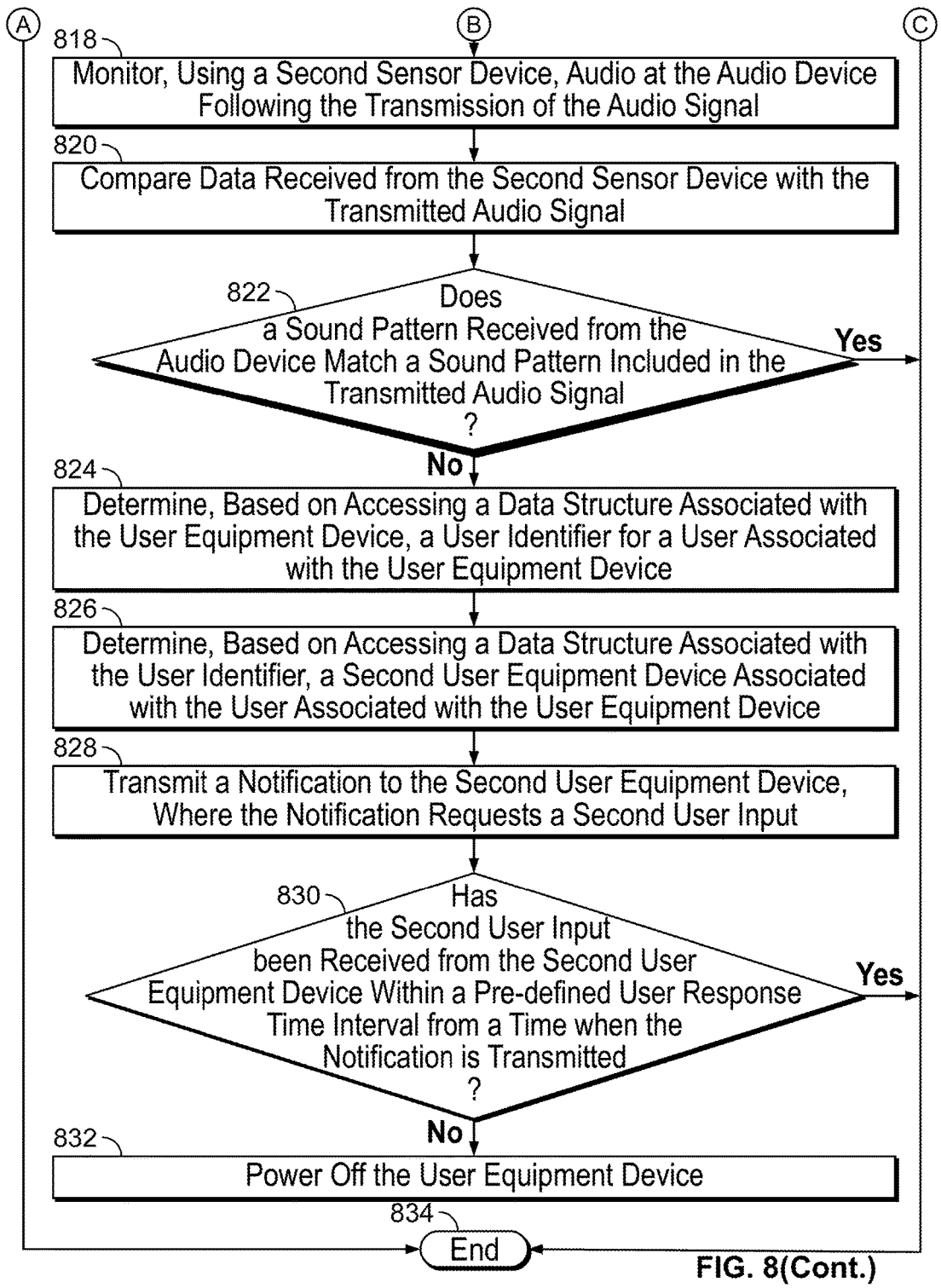

FIG. 8 is a flowchart of illustrative steps involved in determining whether to perform a power management process at a given user equipment device, in accordance with some embodiments of the disclosure. Process 800 may be executed by control circuitry 404 (FIG. 4) as instructed by the media guidance application. Control circuitry 404 may be implemented on user equipment 502, 504, and/or 506 (FIG. 5). In addition, one or more steps of process 800 may be incorporated into or combined with one or more steps of any other process or embodiment.

Process 800 begins at 802 where control circuitry 404 begins process for performing a power management process to reduce power consumption of the user equipment device. Process 800 continues to 804 where control circuitry 404 generates for display, on a display device associated with the user equipment device, a notification, where the notification requests a first user input. For example, control circuitry 404 may display, on a display associated with user equipment device 102, a notification 110 (e.g., "Are you still watching?") along with a user selectable option 112 (e.g., "Yes"). Control circuitry 404 may generate for display the notification 110 at time 150 upon determining that end point 106 for media asset 104 has been reached. Process 800 continues to 806 where control circuitry 404 determines whether the first user input been received within a pre-defined user response time interval from a time when the notification was displayed. For example, control circuitry 404 may start incrementing, based on a reference clock, a response time counter, initialized at zero, from the time the notification is displayed. Control circuitry 404 may set the response time counter to zero upon receiving the user input via user input interface 410. As an illustrative example, the response time counter may be in the format (hour: minute: second). Control circuitry 404 may access a data structure associated with user equipment device 102 (e.g., default parameters data structure) to retrieve the pre-defined user response time interval (e.g., one minute).

If, at 806, control circuitry 404 determines that the first user input was received within a pre-defined user response time interval from a time when the notification was displayed, process 800 continues to 834. At 834, process 800 terminates. For example, control circuitry 404 may determine that selectable option 112 was selected within one minute of displaying notification 110 and accordingly, process 800 may continue to 834. If, at 806, control circuitry 404 determines that the first user input was not received within a pre-defined user response time interval from a time when the notification was displayed, process 800 continues to 808. For example, control circuitry 404 may detect that the selectable option 112 (e.g., "yes") has not been selected within one minute and one second after the display of notification 110 and update the value of the response time counter to (00:01:01). Control circuitry 404 may determine, based on executing an appropriate Boolean comparison function, that the response time counter (e.g., (00:01:01)) exceeds the pre-defined user response time interval (e.g., (00:01:00) or one minute). Accordingly, control circuitry 404 may determine the user input (e.g., selection of selectable option 112) is not received within the pre-defined user response time interval.

At 808, control circuitry 404 transmits a video signal from the user equipment device to the display device associated with the user equipment device. For example, control circuitry 404 may transmit a video signal for an overlay "This is a test." to a display screen associated with user equipment device 102. Process 800 continues to 810 where control circuitry 404 monitors, using a first sensor device, display at the display device following the transmission of the video signal. For example, control circuitry 404 may use an image capture device (e.g., a camera) to capture a series of images that are displayed on the display screen associated with user equipment device 102 after the video signal is transmitted to the display screen.

Process 800 continues to 812 where control circuitry 404 compares data received from the first sensor device with the transmitted video signal. Process 800 continues to 814 where control circuitry 404 determines whether an image displayed at the display device matches an image included in the transmitted video signal. As an illustrative example, control circuitry 404 may access a data structure associated with the video signal to retrieve a video frame (i.e., the expected image) of the video signal. Control circuitry 404 may fingerprint (e.g., using a hashing algorithm) the retrieved video frame to create a fingerprint for the video frame (e.g., "video frame hash"). Similarly, control circuitry 404 may retrieve an image of the display presented on the display screen associated with user equipment device 104 that was captured by the image capture device following the transmission of the video signal. Control circuitry 404 may fingerprint, in manners described previously, the retrieved captured image. For example, control circuitry 404 may compute a "captured image hash." Control circuitry 404 may determine, by executing a program script that takes two numerical values as inputs and outputs whether the two values are a match based on how similar the two values are, whether the "captured image hash" matches the "video frame hash."

If, at 814, control circuitry 404 determines that an image displayed at the display device matches an image included in the transmitted video signal, process 800 continues to 834. At 834, process 800 terminates. For example, control circuitry 404 may receive a result from the program script that indicates that the "captured image hash" matches the "video frame hash" and accordingly, process may continue to 834. If, at 814, control circuitry 404 determines that an image displayed at the display device does not match an image included in the transmitted video signal, process 800 continues to 816. At 816, control circuitry 404 transmits an audio signal from the user equipment device to an audio device associated with the user equipment device. For example, control circuitry 404 may transmit an audio signal for "Hello!" to a speaker associated with user equipment device 102. Process 800 continues to 818 where control circuitry 404 monitors, using a second sensor device, audio at the audio device following the transmission of the audio signal. For example, control circuitry 404 may use a sound detector to capture the sound that is emitted by the speaker after the audio signal is transmitted to the speaker.

Process 800 continues to 820 where control circuitry 404 compares data received from the second sensor device with the transmitted audio signal. Process 800 continues to 822 where control circuitry 404 determines whether a sound pattern received from the audio device matches a sound pattern included in the transmitted audio signal. As an illustrative example, control circuitry 404 may access a data structure associated with the audio signal to retrieve a sound signature (i.e., the expected sound) for the audio signal. As an illustrative example, the sound signature for the audio signal may be the frequency makeup of the audio signal. Control circuitry 404 may retrieve, from the data received from the sound detector, the sound emitted by the speaker following transmission of the audio signal to the speaker (i.e., sound pattern received from the audio device). The media guidance application may determine (e.g., by performing Fast Fourier transform of the sound signal) a sound signature of the sound emitted by the speaker following transmission of the audio signal to the speaker. Control circuitry 404 may determine, by executing a program script that takes two different frequency make-ups as inputs and outputs whether the two frequency make-ups are a match based on how similar the two frequency make-ups are, whether the sound signature of the audio signal matches the sound signature of the sound emitted by the speaker.

If, at 822, control circuitry 404 determine that a sound pattern received from the audio device matches a sound pattern included in the transmitted audio signal, process 800 continues to 834. At 834, process 800 terminates. For example, control circuitry 404 may receive an output from the program script that indicates that the sound signature of the audio signal matches the sound signature of the sound emitted by the speaker. If, at 822, control circuitry 404 determines that a sound pattern received from the audio device does not match a sound pattern included in the transmitted audio signal, process 800 continues to 824. For example, the speaker may be turned off when the audio signal is transmitted. Consequently, there may be no sound emitted by the speaker. As a result, sound signature of the audio signal and the sound signature of the sound emitted by the speaker may be very different and control circuitry 404 may determine that the audio signal and the sound emitted by the speaker are not a match.

At 824, control circuitry 404 determines, based on accessing a data structure associated with the user equipment device, a user identifier for a user associated with the user equipment device. For example, control circuitry 404 may access a current user data structure associated with user equipment device 102 (e.g., a television) to retrieve the user name "John Smith." Process 800 continues to 826 where control circuitry 404 determines, based on accessing a data structure associated with the user identifier, a second user equipment device associated with the user associated with the user equipment device. For example, control circuitry 404 may access the user profile for "John Smith" and retrieve an identifier (e.g., mobile phone number) for a mobile device associated with "John Smith." Process 800 continues to 828 where control circuitry 404 transmits a notification to the second user equipment device, where the notification requests a second user input. For example, control circuitry 404 may transmit a notification "Are you still using user equipment device 102?" along with a user selectable option "Yes" to John Smith's mobile device.

Process 800 continues to 830 where control circuitry 404 determines whether the second user input was received from the second user equipment device within a pre-defined user response time interval from a time when the notification is transmitted. Control circuitry 404 may determine, in manners described previously in relation to determining whether a response is received within a pre-defined time interval after displaying a notification on a display device associated with user equipment device 102, whether user selection of the selectable option 112 (e.g., "yes") is received at the mobile device within a pre-defined time interval (e.g., one minute after transmission of the notification to the mobile device). If, at 830, control circuitry 404 determines that the second user input was not received from the second user equipment device within a pre-defined user response time interval from a time when the notification is transmitted, process 800 continues to 832. At 832, control circuitry 404 powers off the user equipment device. For example, control circuitry 404 may determine the selectable option 112 has not been selected at the mobile device within one minute after the transmission of the notification to the mobile device. Responsively, control circuitry 404 may turn off user equipment device 102. If, at 830, control circuitry 404 determines that the second user input was received from the second user equipment device within a pre-defined user response time interval from a time when the notification is transmitted, process 800 continues to 834. At 834, process 800 terminates.

It is contemplated that the steps or descriptions of FIGS. 6-8 may be used with any other embodiment of this disclosure. In addition, the steps and descriptions described in relation to FIG. 6-8 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for determining whether to perform a power management process, the method comprising:
   monitoring for indicators of user activity at a user equipment device;
   determining, based on data from the monitoring for indicators of user activity, that user inactivity time is greater than a threshold inactivity time, wherein the user inactivity time corresponds to a duration of time from a time corresponding to a last detected indicator of user activity at the user equipment device to a current time;
   determining a media asset currently being presented at the user equipment device;
   determining, based on accessing a data structure associated with the media asset, a start time corresponding to a start point of the media asset and an end time corresponding to the end point of the media asset;
   determining, based on comparing the current time with the end time for the media asset, that the end point for the media asset has not been reached;
   in response to determining that the end point for the media asset has not been reached, determining, based on the current time and the start time, a playback duration for which the media asset has been presented;
   determining, based on comparing the playback duration with a threshold playback duration, whether the playback duration exceeds the threshold playback duration;
   in response to determining that the playback duration exceeds the threshold playback duration, continuing monitoring for indicators of user activity at the user equipment device until the end time is reached;
   determining, based on data from the monitoring for indicators of user activity at the user equipment device until the end time is reached, an updated user inactivity time;
   determining, based on comparing the updated user inactivity time with the threshold inactivity time, that the updated inactivity time exceeds the threshold inactivity time; and
   in response to determining that the user inactivity exceeds the threshold inactivity time, performing a power management process to reduce power consumption of the user equipment device.

2. The method of claim 1, wherein performing the power management process comprises:
   generating for display, on a display device associated with the user equipment device, a notification, wherein the notification requests a user input;
   determining whether the user input is received within a pre-defined user response time interval from a time when the notification is displayed; and
   in response to determining that the user input is not received within the pre-defined user response time interval, powering off the user equipment device.

3. The method of claim 2, wherein generating for display the notification comprises:
   determining, based accessing a data structure associated with a different media asset currently being presented, a next segment in the different media asset that is associated with an importance score below a threshold importance score; and
   generating for display the notification during the next segment in the different media asset.

4. The method of claim 3, wherein the threshold importance score is determined based in part on a user profile data structure corresponding to a user associated with the user equipment device and an attribute associated with the different media asset currently being presented.

5. The method of claim 1, wherein performing the power management process comprises:
   transmitting a video signal from the user equipment device to a display device associated with the user equipment device;
   monitoring, using a first sensor device, display at the display device following the transmission of the video signal;
   determining, based on comparing data received from the first sensor device with the transmitted video signal, whether an image displayed at the display device matches an image included in the transmitted video signal; and
   in response to determining that the image displayed at the display device does not match the image included in the transmitted video signal, automatically, without any user input, powering off the user equipment device.

6. The method of claim 5, further comprising:
   in response to determining that the image displayed at the display device does not match the image included in the transmitted video signal, transmitting an audio signal from the user equipment device to an audio device associated with the user equipment device;
   monitoring, using a second sensor device, audio at the audio device following the transmission of the audio signal;
   determining, based on comparing data received from the second sensor device with the transmitted audio signal, whether a sound pattern received from the audio device matches a sound pattern included in the transmitted audio signal; and
   in response to determining that the sound pattern received from the audio device does not match the sound pattern included in the transmitted audio signal, automatically, without any user input, powering off the user equipment device.

7. The method of claim 6, wherein the user equipment device is a first user equipment device, further comprising:
   in response to determining that the sound pattern received from the audio device does not match the sound pattern included in the transmitted audio signal, determining, based on accessing a data structure associated with the first user equipment device, a user identifier for a user associated with the first user equipment device;

determining, based on accessing a data structure associated with the user identifier, a second user equipment device associated with the user associated with the first user equipment device;

transmitting a notification to the second user equipment device, wherein the notification requests a user input;

determining whether the user input is received from the second user equipment device within a pre-defined user response time interval from a time when the notification is transmitted; and in response to determining that the user input is not received within the pre-defined user response time interval, powering off the first user equipment device.

8. The method of claim 1, wherein performing the power management process comprises at least one of:

terminating a content streaming application at the user equipment device;

powering-off the user equipment device;

switching the user equipment device to a low power mode;

powering-off another user equipment device that is associated with the user equipment device; and switching the another user equipment to a low power mode.

9. The method of claim 1, wherein the threshold inactivity time is based in part on a user profile data structure corresponding to a user associated with the user equipment device and wherein the threshold playback duration is based in part on an attribute associated with the media asset currently being presented.

10. The method of claim 1, wherein monitoring for indicators of user activity at a user equipment device further comprises:

determining, based on accessing a data structure associated with the user equipment device, a user identifier for a user associated with the user equipment device;

determining, based on the user identifier, a user profile associated with the user associated with the user equipment device;

determining, based on accessing the user profile associated with the user, a social media account associated with the user;

determining, based on accessing the social media account associated with the user, whether the user updated the social media account with information about the media asset currently being presented while the media asset was being presented; and in response to determining that the user updated the social media account with information about the media asset currently being presented while the media asset was being presented, determining that an indicator of user activity is detected.

11. A system for determining whether to perform a power management process, the system comprising:

control circuitry configured to:

monitor for indicators of user activity at a user equipment device;

determine, based on data from the monitoring for indicators of user activity, that user inactivity time is greater than a threshold inactivity time, wherein the user inactivity time corresponds to a duration of time from a time corresponding to a last detected indicator of user activity at the user equipment device to a current time;

determine a media asset currently being presented at the user equipment device;

determine, based on accessing a data structure associated with the media asset, a start time corresponding to a start point of the media asset and an end time corresponding to the end point of the media asset;

determine, based on comparing the current time with the end time for the media asset, that the end point for the media asset has not been reached;

in response to determining that the end point for the media asset has not been reached, determine, based on the current time and the start time, a playback duration for which the media asset has been presented;

determine, based on comparing the playback duration with a threshold playback duration, whether the playback duration exceeds the threshold playback duration;

in response to determining that the playback duration exceeds the threshold playback duration, continue monitoring for indicators of user activity at the user equipment device until the end time is reached;

determine, based on data from the monitoring for indicators of user activity at the user equipment device until the end time is reached, an updated user inactivity time;

determine, based on comparing the updated user inactivity time with the threshold inactivity time, that the updated inactivity time exceeds the threshold inactivity time; and in response to determining that the user inactivity exceeds the threshold inactivity time, perform a power management process to reduce power consumption of the user equipment device.

12. The system of claim 11, wherein performing the power management process comprises the control circuitry further configured to:

generate for display, on a display device associated with the user equipment device, a notification, wherein the notification requests a user input;

determine whether the user input is received within a pre-defined user response time interval from a time when the notification is displayed; and in response to determining that the user input is not received within the pre-defined user response time interval, power off the user equipment device.

13. The system of claim 12, wherein the control circuitry is further configured, when generating for display the notification, to:

determine, based accessing a data structure associated with a different media asset currently being presented, a next segment in the different media asset that is associated with an importance score below a threshold importance score; and generate for display the notification during the next segment in the different media asset.

14. The system of claim 13, wherein the threshold importance score is determined based in part on a user profile data structure corresponding to a user associated with the user equipment device and an attribute associated with the different media asset currently being presented.

15. The system of claim 11, wherein the control circuitry is further configured, when performing the power management process, to:

transmit a video signal from the user equipment device to a display device associated with the user equipment device;

monitor, using a first sensor device, display at the display device following the transmission of the video signal;

determine, based on comparing data received from the first sensor device with the transmitted video signal, whether an image displayed at the display device matches an image included in the transmitted video signal; and in response to determining that the image displayed at the display device does not match the image included in the transmitted video signal, automatically, without any user input, power off the user equipment device.

16. The system of claim 15, wherein the control circuitry is further to:

in response to determining that the image displayed at the display device does not match the image included in the transmitted video signal, transmit an audio signal from the user equipment device to an audio device associated with the user equipment device;

monitor, using a second sensor device, audio at the audio device following the transmission of the audio signal;

determine, based on comparing data received from the second sensor device with the transmitted audio signal, whether a sound pattern received from the audio device matches a sound pattern included in the transmitted audio signal; and in response to determining that the sound pattern received from the audio device does not match the sound pattern included in the transmitted audio signal, automatically, without any user input, power off the user equipment device.

17. The system of claim 16, wherein the user equipment device is a first user equipment device and wherein the control circuitry is further to:

in response to determining that the sound pattern received from the audio device does not match the sound pattern included in the transmitted audio signal, determine, based on accessing a data structure associated with the first user equipment device, a user identifier for a user associated with the first user equipment device;

determine, based on accessing a data structure associated with the user identifier, a second user equipment device associated with the user associated with the first user equipment device;

transmit a notification to the second user equipment device, wherein the notification requests a user input;

determine whether the user input is received from the second user equipment device within a pre-defined user response time interval from a time when the notification is transmitted; and in response to determining that the user input is not received within the pre-defined user response time interval, power off the first user equipment device.

18. The system of claim 11, wherein the control circuitry is further configured, when performing the power management process, to at least one of:

terminate a content streaming application at the user equipment device;

power-off the user equipment device;

switch the user equipment device to a low power mode;

power-off another user equipment device that is associated with the user equipment device; and switch the another user equipment to a low power mode.

19. The system of claim 11, wherein the threshold inactivity time is based in part on a user profile data structure corresponding to a user associated with the user equipment device and wherein the threshold playback duration is based in part on an attribute associated with the media asset currently being presented.

20. The system of claim 11, wherein the control circuitry is further configured, when monitoring for indicators of user activity at a user equipment device, to:

determine, based on accessing a data structure associated with the user equipment device, a user identifier for a user associated with the user equipment device;

determine, based on the user identifier, a user profile associated with the user associated with the user equipment device;

determine, based on accessing the user profile associated with the user, a social media account associated with the user;

determine, based on accessing the social media account associated with the user, whether the user updated the social media account with information about the media asset currently being presented while the media asset was being presented; and in response to determining that the user updated the social media account with information about the media asset currently being presented while the media asset was being presented, determine that an indicator of user activity is detected.

* * * * *